(12) United States Patent
Shimazaki et al.

(10) Patent No.: US 8,368,839 B2
(45) Date of Patent: Feb. 5, 2013

(54) OPTICAL ADJUSTING MEMBER AND ILLUMINATION DEVICE AND LIQUID CRYSTAL DISPLAY DEVICE INCLUDING THE SAME

(75) Inventors: Katsusuke Shimazaki, Ibaraki (JP); Yoichi Ogawa, Ibaraki (JP); Masataka Sato, Ibaraki (JP); Eiji Koyama, Ibaraki (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 1229 days.

(21) Appl. No.: 12/129,486

(22) Filed: May 29, 2008

(65) Prior Publication Data
US 2008/0297699 A1 Dec. 4, 2008

(30) Foreign Application Priority Data

May 31, 2007 (JP) .................. 2007-145847
Nov. 27, 2007 (JP) .................. 2007-305718
Nov. 30, 2007 (JP) .................. 2007-311509

(51) Int. Cl.
*G02F 1/1335* (2006.01)

(52) U.S. Cl. ............. 349/64; 349/61; 349/62; 349/63; 349/65

(58) Field of Classification Search ................. None
See application file for complete search history.

(56) References Cited

U.S. PATENT DOCUMENTS

| 6,151,166 A * | 11/2000 | Matsushita et al. ........... 359/566 |
| 2006/0280099 A1 | 12/2006 | Murakami |
| 2008/0165542 A1* | 7/2008 | Kim et al. .................. 362/339 |

FOREIGN PATENT DOCUMENTS

| JP | 08-054503 A | 2/1996 |
| JP | 10-506500 A | 6/1998 |
| JP | 10-319217 A | 12/1998 |
| JP | 2007-004131 A | 1/2007 |
| WO | WO-96/10148 A1 | 4/1996 |

* cited by examiner

*Primary Examiner* — Thanh-Nhan P Nguyen
(74) *Attorney, Agent, or Firm* — Birch, Stewart, Kolasch & Birch, LLP

(57) ABSTRACT

An optical adjusting member according to the invention includes a base member having optical transparency and a plurality of linear members provided on the base member and having optical transparency. A section of the linear member orthogonal to the lengthwise direction of the linear member includes a triangular first sectional part defined by first to third sides and an approximately triangular second sectional part. The second sectional part has a smaller area than that of the first sectional part and defined by fourth to sixth sides. The first side of the first sectional part is in contact with the surface of the base member. The second sectional part is formed on the second side of the first sectional part, and the fourth side of the second sectional part is in contact with the second side of the first sectional part.

22 Claims, 11 Drawing Sheets

OPTICAL ADJUSTING MEMBER AND ILLUMINATION DEVICE AND LIQUID CRYSTAL DISPLAY DEVICE INCLUDING THE SAME

BACKGROUND OF THE INVENTION

1. Field of the Invention

The present invention relates to an optical adjusting member that controls the traveling direction of incident light and an illumination device and a liquid crystal display device including the same.

2. Description of the Background Art

Various conventional illumination devices such as a backlight unit for a liquid crystal display include mechanisms for adjusting the diffusion and brightness of light from a light source. Most illumination devices include a sheet used to control the directivity of light in its optical path or at the outlet of a light source housing. The optical adjusting member has optical transparency and is capable of collimating incident light in a predetermined direction or diffusing incident light.

A prism sheet is a typical example of the optical adjusting member having the capability of collimating incident light in a predetermined direction, in other words, the capability of controlling its optical directivity (see for example JP 10-506500 A). In general, the prism sheet includes a plurality of optical members that extend in a predetermined direction and each has a triangular section orthogonal to its lengthwise direction (hereinafter also referred to as "prism member") or a plurality of optical members having a semi-circular (semi-elliptical) section (hereinafter also referred to as "lens type member") continuously arranged on a sheet type base member. The traveling direction of light is controlled by taking advantage of the prism effect or lens effect provided by these optical members formed on the base member.

In a backlight unit for a liquid crystal display device, using two prism sheets including a plurality of prism members as described above provided on a base member, the lengthwise directions of the prism members of the prism sheets are orthogonal to each other (see for example JP 10-506500 A). A general structure of the backlight unit for such a liquid crystal display device is shown in FIG. 1. A general structure of the prism sheet is shown in FIG. 2. As shown in FIG. 1, a backlight unit 501 for a liquid crystal display device includes a light source 503, a light guide plate 504 that changes light 510 radiated from the light source 503 into a surface light source, a reflection sheet 505 provided under the light guide plate 604 (on the opposite side to a liquid crystal display panel 502), and a plurality of functional optical sheet groups 506 to 508 provided on the light guide plate 504 (on the side of the liquid crystal display panel 502). The functional optical sheet groups include the lower diffusion sheet 506, the prism sheet group 507 and the upper diffusion sheet 508.

The backlight unit as shown in FIG. 1 is a so-called edge light (side light) type illumination device having the light source 503 arranged on a side part of the light guide plate 504. The light 510 radiated from the light source 503 is incident to the side part of the light guide plate 504 and the incident light is output from the surface 504a of the light guide plate 504. At the time, the outgoing light 511 from the light guide plate 504 is collimated in the directivity to some extent, and its direction is inclined at a predetermined angle with respect to the normal direction of the output surface 504a. In the inclination direction, the luminance of the outgoing light 511 is maximized. In the following description, the light component of the outgoing light 511 traveling in the inclination direction in which the luminance is maximized will be referred to as "luminance peak light." Note that in FIG. 1, the members are shown as they are apart from one another for the ease of illustrating the structure of the liquid crystal display device 500, while in practice, the members are stacked in contact with one another.

The prism sheet group 507 includes two prism sheets 507a and 607b. As shown in FIG. 2, in each of the prism sheets, prism members 507d that extend in a predetermined direction and each have a triangular section orthogonal to the lengthwise direction are arranged in parallel on a sheet base member 507c. In the backlight unit 501, the lengthwise directions of the prism members 507d of the prism sheets 507a and 507b are arranged orthogonal to each other.

As described above, in a conventional backlight unit for a liquid crystal display device, a prism sheet (optical adjusting member) having a plurality of optical members (in a triangular prism shape) as shown in FIG. 2 is used so that light output from the light guide plate is collected and efficiently irradiated upon the liquid crystal display panel. The conventional prism sheet has good light collecting capability but the use of a single prism sheet causes the color separation of light output from the prism sheet. Consequently, when an object is illuminated with an illumination device using the prism sheet, the edge part of the shadow of the object could be blurred with color or when the prism sheet is used for a backlight unit for a liquid crystal display device, a color may look different between when it is viewed at a certain angle and when it is viewed from the front. Besides, the use of only a single prism sheet does not provide sufficient luminance.

The above-described color separation will be described more specifically with FIG. 4. FIG. 4 is an enlarged sectional view of the prism member 507d of the prism sheet 507a shown in FIG. 2 showing how light 512 is refracted at the prism member 507d as the light 512 is incident to the prism sheet 507a at a predetermined incident angle. Note that FIG. 4 shows the case in which a conventional prism sheet is directly provided on the output surface of the optical guide plate, in other words, how light is refracted in an edge light type backlight unit having the structure as shown in FIG. 3 for the ease of illustrating the problem of the color separation. The light 512 in FIG. 4 represents the light component of light 511 incident to the prism sheet 507a that advances in the direction in which the luminance is maximized, i.e., luminance peak light.

The luminance peak light 512 incident to the prism member 607d is refracted at the surface 507e of the prism member 507d on the side of the light traveling direction as shown in FIG. 4 and output in the thickness-wise direction of the prism sheet 507a. At the time, the refractive index of the material forming the prism member 507d (prism sheet 507a) varies depending on the wavelength of the light, and therefore the amount of refraction at the surface 507e of the prism member 507d varies depending on the waveform component included in the luminance peak light 512. As a result, as shown in FIG. 4, the refraction direction of the refracted light at the surface 507e changes depending on the waveform and color separation is generated in a prescribed pattern in the output light 513 from the prism sheet 507a. Note that in FIG. 4, separation of only two waveform components is shown for the ease of description.

Besides the problem of the color separation described above, sufficient luminance does not result using only a single prism sheet. A backlight unit for use in a conventional liquid crystal display device, especially in an edge light type backlight unit, a plurality of optical sheet groups (prism sheets 507a and 507b and diffusion sheets 506 and 508) are normally used as shown in FIG. 1 in order to solve the problems of the color separation and insufficient luminance described above.

In an illumination device and a liquid crystal display device having the structure as shown in FIG. 1, however, a large number of optical sheet groups (the two prism sheets and two diffusion sheets in the example in FIG. 14) are necessary, which restricts reduction in the thickness and the cost of the illumination device and the liquid crystal display device.

SUMMARY OF THE INVENTION

The present invention is directed to a solution to the above-described problems, and it is an object of the invention to provide an optical adjusting member capable of solving the problems of color separation and insufficient luminance.

An optical adjusting member according to the invention includes a base member having optical transparency and a plurality of linear members provided on the base member and having optical transparency. A section of each of the linear members orthogonal to its lengthwise direction includes a first sectional part in a approximately triangular shape defined by first to third sides and a second sectional part in an approximately triangular shape having a smaller area than that of the first sectional part and defined by fourth to sixth sides. The first side of the first sectional part is in contact with the surface of the base member. The second sectional part is provided on the second side of the first sectional part and the fourth side of the second sectional part is in contact with the second side of the first sectional part.

The inventors have eagerly studied about optical adjusting members that control the traveling direction of incident light and found that the use of the optical adjusting member having the above-described structure can restrain the color separation of output light. Because of the above-described structure of the optical adjusting member, the color separation pattern of light refracted at a surface including the fifth side of the second sectional part and the color separation pattern of light refracted at a surface including the sixth side of the second sectional part are reversed from each other with respect to the traveling direction of light. incident to the optical adjusting member, and the color separation cancels each other between the light refracted at the surface of the fifth side and the light refracted at the surface of the sixth side.

Furthermore, the use of the optical adjusting member according to the invention in an illumination device with a light guide plate, the traveling direction of light output from the light guide plate and having its directivity arranged to be parallel to some extent can be directly changed in the thickness-wise direction of the optical adjusting member. Therefore, the lower diffusion sheet between the prism sheet groups and the light guide plate in the conventional illumination device is not necessary. More specifically, in the optical adjusting member according to the invention, light output from the light guide plate and having its directivity arranged to be parallel to some extent does not have to be once changed into broad light using the lower diffusion sheet. Therefore, the use efficiency of the light output from the light guide plate can be improved and the luminance characteristic can be improved.

In the optical adjusting member according to the invention, a plurality of second sectional parts are preferably provided on the second side of the first sectional part.

In the optical adjusting member according to the invention, the plurality of second sectional parts preferably have the same shape and size. In the optical adjusting member according to the invention, the plurality of second sectional parts preferably have similar shapes to one another. In the optical adjusting member according to the invention, the vertical angles of the plurality of second sectional parts opposed to the fourth sides are preferably the same angle among one another.

In the optical adjusting member according to the invention, between the fifth and sixth sides of the second sectional part, the side closer to the vertical angle opposed to the first side of the first sectional part is preferably shorter than the other side. In this way, the use efficiency of the incident light can further be improved and the luminance characteristic can further be improved.

In the optical adjusting member according to the invention, the fifth side and sixth side of the second sectional part are preferably inclined with respect to the fourth side so that when luminance peak light that travels in the direction in which its luminance is maximized in the luminance characteristic of light incident to the optical adjusting member is refracted at the optical adjusting member, the traveling direction of the luminance peak light after the refraction at the surface of the linear member including the fifth side of the second sectional part and the traveling direction of the luminance peak light after the refraction at the surface of the linear member including the sixth side are reversed from each other with respect to the traveling direction of the luminance peak light before the refraction.

In the optical adjusting member according to the invention, the inclination direction of the third side of the first sectional part to the first side is preferably approximately parallel to the luminance peak light described above. More preferably, the angle formed between the third side and the first side of the first sectional part is the same or greater than the angle of luminance peak light incident to the optical adjusting member with respect to the base member. In this way, the reflection and refraction of incident light at the surface including the third side of the first sectional part is extremely reduced, which further improves the use efficiency of the incident light.

In the optical adjusting member according to the invention, the plurality of linear members are preferably provided periodically in the direction orthogonal to its lengthwise direction.

In the optical adjusting member according to the invention, when the refractive index of the linear member is $n_1$, the refractive index no of the air that surrounds the base member and the linear members is 1.0, the angle formed by the normal direction of an interface between the air and the base member and the direction of the light in the air is $I_1$ degree, the angle formed by the normal direction and the direction of the light inside the linear member is $I_2$ degree, and the angle formed by the first and second sides, the angle formed by the fourth and fifth sides, and the angle formed by the fourth and sixth sides are $\alpha_1$, $\alpha_2$, and $\beta_2$ degree, respectively, the following expressions are preferably satisfied.

$$n_0 \sin I_1 = n_1 \sin I_2$$

$$0 \leq \sin(\alpha_1 + \alpha_2 - I_2) \leq 1/n_1$$

$$I_2 \leq \alpha_1 + \alpha_2 \leq I_2 + 90$$

$$-I_2 \leq \beta_2 - \alpha_1 \leq 90 - I_2$$

In this way, light incident to the base member and the linear member may be extracted to the outside without the total reflection of light and associated loss of the light is restrained.

In the optical adjusting member according to the invention, when the refractive index of the linear member is $n_1$, the critical angle for total reflection of the light at the interface between the air that surrounds the base and the linear members and the linear members is $I_{2max}$ degree, where sin $I_{2max}=1/n_1$ is satisfied, and the angle formed by the first and second sides and the angle formed by the fourth and fifth sides are $\alpha_1$ and $\alpha_2$ degree, respectively, the following expression- is preferably satisfied.

$$\alpha_1+\alpha_2 \leq 2 \cdot I_{2max}$$

If the sum of the angles ($\alpha_1+\alpha_2$) is not more than $2 \cdot I_{2max}$, incident light can be output from the optical adjusting member to the outside without total reflection regardless of the incident angle of the incident light.

In the optical adjusting member according to the invention, the refractive index of the base member is preferably the same as the refractive index $n_1$ of the linear member. In this way, the refractive indexes of the base member and the linear member are the same and therefore light advances straightforward through the joint surface (interface) between the base member and the linear member. Therefore, the joint surface between the base member and the linear member can take an arbitrary form, which provides increased flexibility in designing. In addition, the base member and the linear member can be formed integrally using the same material.

In the optical adjusting member according to the invention, the base member may have a different refractive index from that of the linear member and may be formed in a parallel-plate shape. In this way, the base member is formed in a parallel-plate shape, and therefore if the base member and the linear member have different refractive indexes, the refraction angle of light at the interface between the base member and the linear member is the same as the refraction angle of light at the interface between the base member and the air. Therefore, the invention can be applied as it is.

Furthermore, in the optical adjusting member according to the invention, the number of the second sectional parts provided on the second side of the first sectional part is preferably from two to nine. In this way, the color separation can sufficiently be reduced, and the luminance characteristic can be improved, so that both of the problems of the color separation and the insufficient luminance can be solved using the single optical adjusting member.

An optical adjusting member according to the invention includes a base member having optical transparency and a plurality of linear members provided on the base member and having optical transparency. A section of the linear member orthogonal to the lengthwise direction of the linear member has an approximately triangular shape, one of the three sides that define the section is in contact with the surface of the base member, and one of the other two sides is provided with steps.

An illumination device according to the invention includes a light source, the above-described optical adjusting member, and a light guide plate used to guide light emitted from the light source to the optical adjusting member.

A liquid crystal display device according to the invention includes a light source, the above-identified optical adjusting member, a light guide plate that guides light emitted from the light source to the optical adjusting member, and a liquid crystal display element provided on the side of the optical adjusting member opposite to the light guide side.

The illumination device and the liquid crystal display device according to the invention include the above-identified optical adjusting member, and therefore the number of necessary optical members can be reduced, and the thickness of the devices can be reduced. In addition, the color separation can be restrained, and the use efficiency of light output from the light guide plate can be improved, so that the luminance characteristic can be improved.

In the illumination device and the liquid crystal display device according to the invention, the above-identified optical adjusting member is preferably provided in contact with the light guide plate.

The illumination device and the liquid crystal display device according to the invention preferably include a reflection member provided on the side of the light guide plate opposite to the optical adjusting member.

In the optical adjusting member according to the invention, a plurality of linear members each have an approximately triangular section orthogonal to the lengthwise direction of the linear member, and one side of the section is step-wise. In this way, the color separation of outgoing light can be restrained using the single optical adjusting member. Furthermore, in the optical adjusting member, the traveling direction of light having its directivity in the predetermined direction can directly be changed to the thickness-wise direction of the optical adjusting member, and therefore the use efficiency of light output from the light guide plate can be improved and the luminance characteristic can be improved.

DESCRIPTION OF THE PREFERRED EMBODIMENTS

Now, an optical adjusting member, an illumination device, and a liquid crystal display device according to non-limitative embodiments of the invention will be described with reference to the accompanying drawings.

First Embodiment

Structure of Optical Adjusting Sheet

Figure 5:
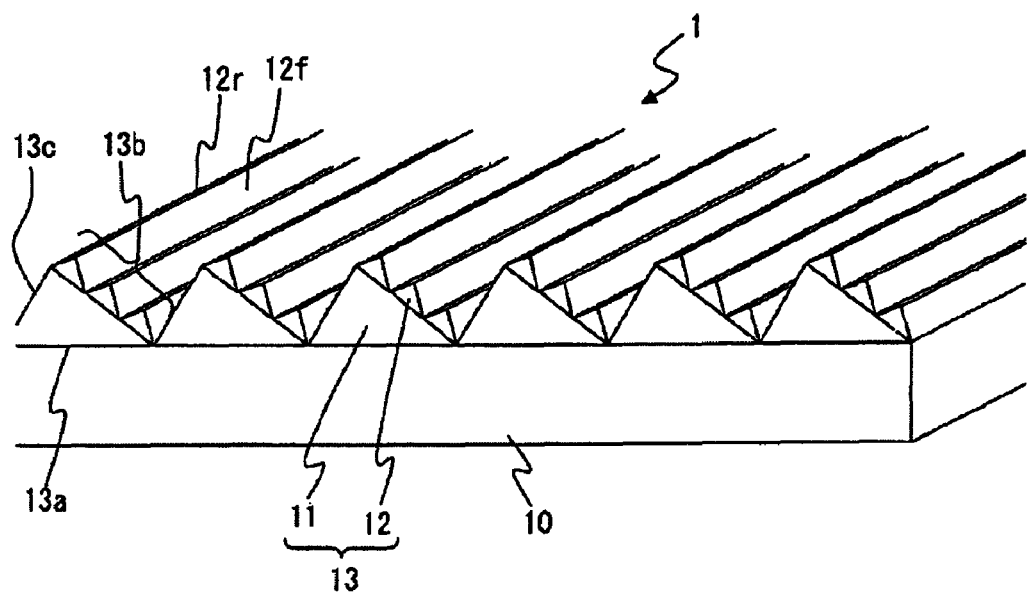
FIG. 5 is a schematic view of an optical adjusting sheet in the first embodiment.

FIG. 5 is a schematic view of an optical adjusting sheet (optical adjusting member) according to a first embodiment of the invention. As shown in FIG. 5, the optical adjusting sheet 1 includes a sheet-type light transmitting (transparent) base member 10 and a plurality of linear optical members 13 (linear members) formed on the base member 10.

The base member 10 preferably has a thickness in the range from 10 μm to 500 μm in consideration of the working readiness and handling ability of the optical adjusting sheet. A material used to form the base member 10 may be for example polyethylene terephthalate (PET). Other than PET, examples of the material used to form the base member 10 may include arbitrary light transmitting materials including polyethylene naphthalate, polystyrene, polycarbonate (PC), polyolefin, polypropylene, cellulose acetate, and inorganic transparent materials such as glass. The shape of the base member 10 is typically a sheet shape, while a base member 10 in a thick plate shape or an arbitrary shape may be used. Furthermore, the surface of the base member 10 may be not only a flat surface but also a three-dimensional surface.

As shown in FIG. 5, a linear optical member 13 has an approximately triangular section orthogonal to its lengthwise direction, and one surface 13a (hereinafter also referred to as "bottom surface") along the lengthwise direction is in parallel and in contact with the surface of the base member 10. More specifically, the linear optical member 13 is provided on the base member 10 so that its bottom surface 13a is opposed to the surface of the base member 10.

As shown in FIG. 5, the plurality of linear optical members 13 have the same shape and size, the plurality of linear optical members 13 are periodically provided in the direction orthogonal to the lengthwise direction, and the base angle parts of adjacent linear optical members 13 are in contact with one another.

Note that the plurality of linear optical members 13 are preferably arranged about at an interval (pitch) of 7 μm to 100 μm. If the pitch of the linear optical members 13 is less than 7 μm, highly precise working is necessary for a die to be used for forming the linear optical members 13, which could push up the cost. If the pitch of the linear optical members 13 is more than 100 μm, and a sheet type base member is used in particular, the following problem is encountered. If the pitch of the linear optical members 13 is more than 100 μm, the size of each of the linear optical member 13 relatively increases, so that the volume of resin used to form the linear optical members 13 increases. Then, when the linear optical members 13 are formed by curing resin, the amount of curing shrinkage of resin increases. In this case, the resin more strongly "clings" to the die, and it would be difficult to separate the resin from the die. The linear optical members 13 could be broken or part of the linear optical members 13 may remain on the surface of the die particularly when the linear optical members 13 are formed on the sheet type base member using a roll-shaped die. If the pitch of the plurality of linear optical members 13 is more than 100 μm, the height of the linear optical members 13 increases, so that the resulting optical adjusting member has an increased thickness.

A material that can be used to form the linear optical members 13 is for example aromatic acrylate ultraviolet curing resin, (with a refractive index of 1.60). Other examples of the material for the linear optical members 13 may include arbitrary resin materials having a refractive index from 1.3 to 1.9, When the linear optical members 13 are formed using a materiel different from the material of the base member 10, examples of the material may include transparent plastic resins such as acrylic resin, urethane resin, styrene resin, epoxy resin, and silicone resin. The linear optical members 13 and the base member 10 may be formed using the same material.

As shown in FIG. 5, the linear optical members 13 each include a first linear prism portion 11 formed on the base member 10 and extending in the same direction as the lengthwise direction of the linear optical members 13 and a plurality of second linear prism portions 12 formed on one of the surfaces that define the vertical angle of the first linear prism portion 11 and extending in the same direction as the lengthwise direction of the linear optical members 13.

The first linear prism portion 11 and the second linear prism portions 12 are integrally formed. More specifically, the surface 13b of the linear optical member 13 having the plurality of second linear prism portions 12 is stepwise (hereinafter also referred to as "stepwise surface"). Note that in FIG. 5, three second linear prism portions 12 are formed on one of the surfaces that define the vertical angle of the first linear prism part 11, while the invention is not limited to the arrangement. The number and shape of the second linear prism portions 12 may be changed as desired depending on their use and required optical characteristics. The second linear prism portions 12 may be provided on both of the two surfaces that form the vertical angle of the first linear prism portion 11 depending on their use and required optical characteristics.

Figure 6:
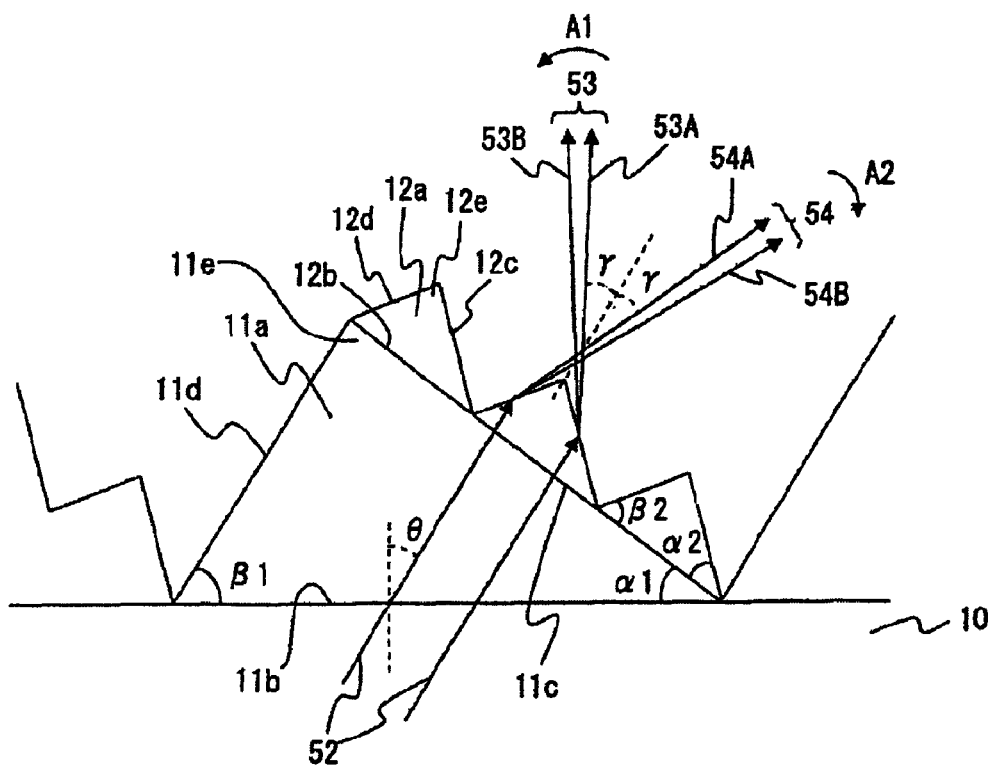
FIG. 6 is an enlarged sectional view of a linear optical member shown in FIG. 1.

FIG. 6 is an enlarged sectional view of the linear optical member 13. Note that incident light 52 is light that travels in the direction in which the luminance is maximized in the luminance characteristic of light incident to the optical adjusting sheet 1, i.e., luminance peak light. A section of the linear optical member 13 orthogonal to the lengthwise direction includes the first sectional part 11a corresponding to the first linear prism portion 11 and the second sectional parts 12a corresponding to the second linear prism portion 12.

The first sectional part 11a is defined by a base 11b (first side) in parallel and in contact with the surface of the base member 10 and two inclined sides 11c (second side) and 11d (third side) extending from the ends of the base 11b at prescribed angles ($\alpha_1$ and $\beta_1$ in FIG. 6). Among the two inclined sides 11c and 11d that form the vertical angle 11e opposed to the base 11b, the length of the inclined side 11c (second side) in contact with the second sectional part 12a is larger than that of the other inclined side 11d (third side). Therefore, the angle $\alpha_1$ (first base angle) formed between the base 11b and the inclined side 11c is smaller than the angle $\beta_1$ (second base angle) formed between the base 11b and the inclined side 11d. More specifically, the shape of the first sectional part 11a is a non-symmetrical triangle (not an isosceles triangle). Note that the inclined sides 11c and 11d may have the same length. In other words, the first sectional part 11a may be an isosceles triangle.

In FIG. 6, the inclination angle of the inclined side 11d with respect to the normal direction of the surface of the base member 10 is approximately the same as the inclination angle θ in the traveling direction of the luminance peak light 52 with respect to the normal direction of the surface of the base member 10. More specifically, the inclination direction of the surface (surface 13c in FIG. 5 which will be also referred to as "flat surface") of the linear optical member 13 including the inclined side 11d is approximately parallel to the travelling direction of the luminance peak light 52. In FIG. 6, the inclination angle $\beta_1$ is slightly larger than the inclination angle (90°−θ) of the luminance peak light 52.

The second sectional part 12a is defined by a base 12b (fourth side) in parallel and in contact with the inclined side 11c (second side) of the first sectional part 11a and two inclined sides 12c and 12d extending at prescribed angles ($\alpha_2$ and $\beta_2$ in FIG. 6) from the ends of the base 12b. In FIG. 6, the length of the inclined side 12d positioned closer to the vertical angle 11e is shorter than that of the other inclined side 12c. Therefore, the angle $\alpha_2$ (first base angle) between the base 12b and the inclined side 12c is smaller than the angle $\beta_2$ (second base angle) between the base 12b and the inclined side 12d. More specifically, in this example, the shape of the second sectional part 12a is a non-symmetrical triangle (not an isosceles triangle). Note that the inclined sides 12c and 12d may have the same length. In other words, the second sectional part 12a may be an isosceles triangle.

Note that the surface 12f of the second linear prism portion 12 including the inclined side 12c serves mainly as a surface that refracts the traveling direction of incident light to the thickness-wise direction of the optical adjusting sheet 1, i.e., as a surface capable of collecting incident light. Therefore, in the following description, the surface 12f will be referred to as "light collecting surface." On the other hand, the surface 12r of the second linear prism portion 12 including the other inclined side 12d mainly serves to restrain the color separation of light output from the optical adjusting sheet 1 and therefore will be referred to as "correction surface" in the following description.

As shown in FIG. 6, the length of the inclined side 12c positioned further from the vertical angle 11e is longer than that of the other inclined side 12d, so that the light collecting surface 12f can be widened and the use efficiency of incident light can be improved.

In this example, as shown in FIG. 6, the first and second base angles $\alpha_2$ and $\beta_2$ of the second sectional part 12a are set so that the refraction direction of light 53 resulting from luminance peak light 52 refracted at the light collecting surface 12f and the refraction direction of light 54 resulting from luminance peak light 52 refracted at the correction surface 12r are reversed from each other with respect to the travelling direction of the luminance peak light 52. In this example, the first and second base angles $\alpha_2$ and $\beta_2$ are set so that the angle y between the refraction direction of a prescribed waveform component of the light 53 (such as a component 53A with a wavelength A in FIG. 6) and the traveling direction of the luminance peak light 52 before the refraction is approximately the same as the angle between the refraction direction of a prescribed waveform component of light 54 (such as a component 54A with a waveform A) and the travelling direction of the luminance peak light 52 before the refraction. In this way, the color separation of light output from the optical adjusting sheet 1 can further be restrained.

Note that as long as the color separation of light output from the optical adjusting sheet 1 can be restrained sufficiently, the angle between the refraction direction of a prescribed waveform component of the light 53 and the travelling direction of the luminance peak light 52 may be different from the angle between the refraction direction of a prescribed waveform component of the light 54 and the travelling direction of the luminance peak light 52.

In FIG. 6, the three second linear prism portions 12 have the same shape and size and the three second linear prism portions 12 are periodically provided in the direction orthogonal to the lengthwise direction, and the base angle parts of adjacent second linear prism portions 12 are in contact with one another. More specifically, the light, collecting surfaces 12f and the correction surfaces 12r of the plurality of second linear prism portions 12 that form the stepwise surface 13b are provided in parallel to one another at equal intervals. However, a plurality of second linear prism portions 12 having different shapes and different sizes may be formed.

Method of Producing Optical Adjusting Sheet

The optical adjusting sheet 1 is produced by the following method. A roll type die having a groove pattern formed on a surface is prepared. The pattern corresponds to the shape of an optical member including a plurality of linear optical members 13. Then, ultraviolet curing resin is filled between a prepared base member 10 and the surface of the die and subjected to ultraviolet irradiation with a wavelength in the range from 340 nm to 420 nm, so that the filled ultraviolet curing resin is cured and the optical adjusting sheet 1 is formed. Then, the optical adjusting sheet 1 is removed from the die. By the method, the optical adjusting sheet 1 having the plurality of linear optical members 13 of ultraviolet curing resin thereon is formed on the base member 10.

Note that the method of producing the optical adjusting sheet according to the invention is not limited to the above-described method and any arbitrary known method may be used. For example, the linear optical members may directly be formed on the base main body by producing the base member using thermosetting resin and heating and pressing a die having an groove pattern formed by cutting on its surface corresponding to the shape of an optical member including a plurality of linear optical members against the base member, so that the groove pattern of the die is transferred, in other words, thermal transfer may be employed. Alternatively, a well-known method such as extrusion molding and press-molding or injection molding (by which molten resin is injected to the die) may be employed to form a plurality of linear optical members on the base member. In this case, the base member and the linear optical members are produced using the same material.

Liquid Crystal Display Device and Illumination Device

Figure 7:
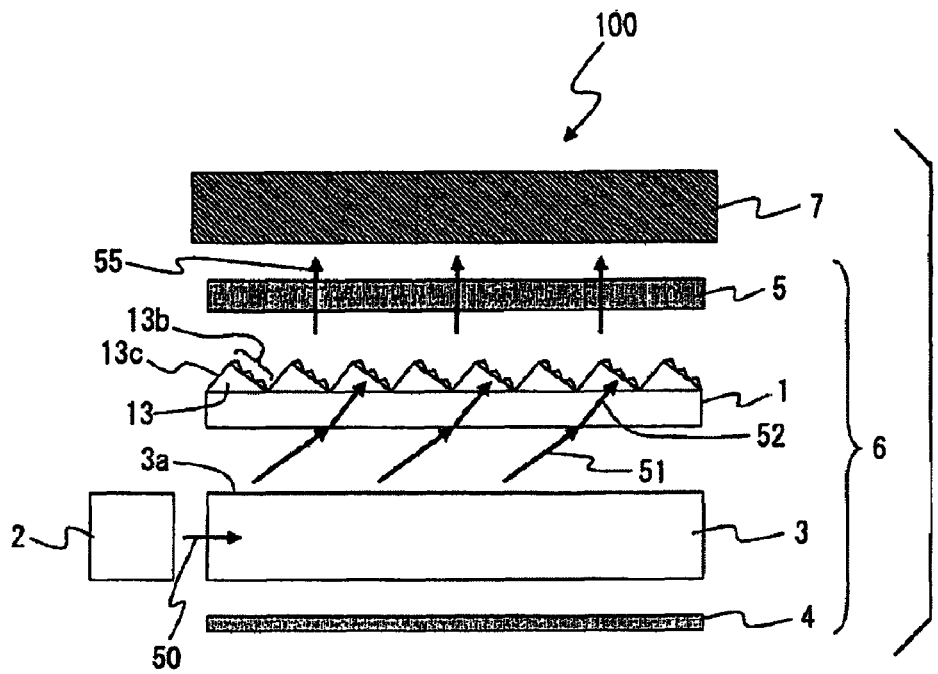
FIG. 7 is a schematic view of a liquid crystal display device using the optical adjusting sheet shown in FIG. 1.

FIG. 7 is a schematic view of a liquid crystal display device using the optical adjusting sheet 1. Note that in FIG. 3, optical members are illustrated as if they are apart from one another for the ease of illustrating the structure of the liquid crystal display device, but they are stacked in contact with one another in an actual device. As shown in FIG. 7, the liquid crystal display device 100 according to the embodiment includes a liquid crystal display panel 7 (liquid crystal display element) and a backlight unit 6 (illumination device).

The liquid crystal display panel 7 is the same as the liquid crystal display panel used in the conventional liquid crystal display device. More specifically, the liquid crystal display panel 7 includes a polarizer plate, a glass substrate, a transparent conductive film forming a pixel electrode, an alignment film, a liquid crystal layer, an alignment film, a transparent conductive film forming a counter electrode, a color filter, a glass substrate and a polarizer plate stacked on one another in the mentioned order.

The backlight unit 6 includes a light source (LED: light emitting diode) 2, a light guide plate 3 that outputs light 50 incident at the side part from its upper surface 3a (output surface), a reflection sheet 4 (reflection member) provided under the light guide plate 3 (on the opposite side to the liquid crystal display panel 7), an optical adjusting sheet 1 provided on the light guide plate 3 (on the side of the liquid crystal display panel 7), and a diffusion sheet 5 provided on the optical adjusting sheet 1.

White light in the visible range is radiated from the light source 2. The backlight unit 6 is an edge light type illumination device and the light source 2 is provided at a side of the light guide plate 3. Light emitted from the light source 2 comes into the light guide plate 3 from the side, advances inside the plate in the direction of light 50 and exits from the output surface 3a. The output light 51 typically has a luminance peak in a prescribed direction inclined toward the traveling direction of the light in the light guide plate 3 (the direction of light 50) from the normal direction of the surface of the light guide plate 3 and has directivity to some extent. Therefore, the optical adjusting member according to the invention is preferably applied to an illumination device, particularly a device like an edge light type backlight. Note that in this case, the optical adjusting sheet 1 must be mounted in the direction so that the step-wise surface 13b becomes a main light receiving surface for the inclined incident light 52, i.e., in the direction as shown in FIG. 7.

The optical members other than the optical adjusting sheet 1 are the same as those used for a conventional backlight unit. More specifically, the light guide plate 3 is for example made of polycarbonate.

When the light guide plate 3 has such an output characteristic that the angle formed between the direction in which the light 51 from the output surface 3a is maximized in luminance (the direction of the luminance peak light) and the direction with respect to the normal direction of the output surface 3a is 70° and the light 51 output from the light guide plate 3 is incident to the optical adjusting sheet 1, the light 51 is refracted at the lower surface of the base member 10. The inclination angle θ of the traveling direction of the luminance peak light 52 (refracted light 51) with respect to the normal direction of the surface of the base member 10 (the thickness-wise direction of the optical adjusting sheet 1) is about 36. The inclination angle θ in the travelling direction of the luminance peak light 52 is preferably adjusted to be slightly greater than the angle between the inclination direction of the flat surface 13c and the normal direction of the surface of the base member 10 (90°−β$_1$).

A sheet produced by vapor-depositing silver on the surface of a PET film is for example used for the reflection sheet 4. A bead-coated PET film is used for the diffusion sheet 5.

Principle of How Color Separation is Restrained

Now, the principle of how the color separation of light from the optical adjusting sheet 1 is restrained will be described with reference to FIGS. 5 to 7.

When the output light 51 from the light guide plate 3 comes into the optical adjusting sheet 1, the incident light is mainly refracted at the step-wise surface 13b. Note that the inclination direction of the flat surface 13c of the linear optical member 13 is approximately parallel to the traveling direction of the luminance peak light 52 as described above, so that the effect of the refraction of the incident light at the flat surface 13c is relatively small.

The luminance peak light 52 incident to the step-wise surface 13b is refracted at the two surfaces defining each of the raised surfaces of the step-wise surface; i.e., at the light collecting surface 12f and the correction surface 12r. At the time, as shown in FIG. 6, the luminance peak light 52 is refracted in the thickness wise direction of the optical adjusting sheet 1 at the light collecting surface 12f (the light 53 in FIG. 6) and in the in-plane direction of the optical adjusting sheet 1 at the correction surface 12r (the light 54 in FIG. 6). More specifically, the traveling direction of the light 53 refracted at the light collecting surface 12f and the traveling direction of the light 54 refracted at the correction surface 12r are reversed from each other with respect to the traveling direction of the luminance peak light 52.

Figure 2:
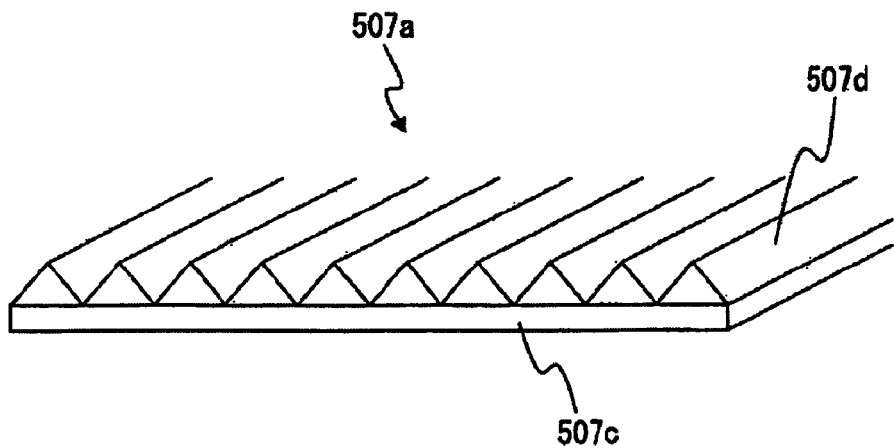
FIG. 2 is a schematic view of a prism sheet.

When the luminance peak light 52 comes into the step-wise surface 13b and is refracted, the refractive index of the material of the linear optical member 13 varies depending on the waveform of the incident light, and therefore the refraction angle varies depending on waveform components included in the luminance peak light 52, and the color separation of the refracted light 53 and 54 is caused as shown in FIG. 6. Note that in FIG. 6, the separation of the two waveform components (waveforms A and B, A>B) is shown for the readiness of illustration. In FIGS. 2, 53A and 54A represent the refracted light of the waveform A component, 53B and 54B represent the refracted light of the waveform B component, and the refraction angle of the waveform B component is greater than the refraction of the waveform A component.

When the luminance peak light 52 is refracted at the light collecting surface 12f, the waveform B component 53B is refracted more greatly than the waveform A component 53A, and therefore the traveling (refracting) direction of the waveform B component 53B is further toward the direction denoted by the arrow A1 than the waveform A component 53A. On the other hand, when the luminance peak light 52 is refracted at the correction surface 12r, the waveform B component 54B is more greatly refracted than the waveform A component 54A, and therefore the traveling direction of the waveform B component 54B is further toward the direction denoted by the arrow A2 than the waveform A component 54A. More specifically, the color (waveform) separation pattern of the light 53 refracted at the light collecting surface 12f and the color separation pattern of the light 54 refracted at the correction surface 12r are reversed patterns with respect to the traveling direction of the luminance peak light 52. Therefore, the color separation of the light 53 is cancelled by the color separation of the light 54, so that the color separation of light output from the optical adjusting sheet 1 and collected at the liquid crystal display surface is restrained.

As described above, in the optical adjusting sheet 1, the color separation of the output light is restrained by the use of a single optical sheet, and therefore, the conventional use of two prism sheets is no longer necessary for restraining the color separation of the output light. The optical adjusting sheet 1 is used to directly change the traveling direction of light output from the light guide plate and having directivity to the thickness-wise direction of the optical adjusting sheet 1, and therefore it is no longer necessary to provide a lower diffusion sheet between a prism sheet group and a light guide plate as in the conventional case. Therefore, it is not necessary to change light output from the light guide plate and having directivity into broad light using the lower diffusion sheet as in the conventional case, and therefore the use efficiency of light output from the light guide plate can be improved and the luminance characteristic can be improved.

In the edge light type liquid crystal display device 100 and the backlight unit 6 including the optical adjusting sheet 1, it is not necessary to use two prism sheets to restrain the color separation of outgoing light, and the lower diffusion sheet is not necessary. Therefore, In the edge light type liquid crystal display device 100 and the backlight unit 6, the number of optical members can be smaller than in the conventional case; and the thickness and the cost of the device can be reduced.

Inventive Example 1

The liquid crystal display device 100 and the backlight unit 6 shown in FIG. 7 was produced as Example 1 and evaluated for the optical characteristic.

More specifically, an optical adjusting sheet 1 in Inventive Example 1 was produced by the above-described manufacturing method. A polyethylene terephthalate (PET) sheet as thick as 50 μm was used as the base member 10. The linear optical member 13 was made of aromatic acrylate ultraviolet curing resin (with a refractive index of 1.60). As for the specific size of the first sectional part 11a, the base 11b had a length of 35 μm, the first base angle $\alpha_1$ was 39.14°; and the second base angle $\beta_1$ was 57.71°. As for the specific size of the second sectional part 12a, the base 12b had a length of about 10.44 μm, the first base angle $\alpha_2$ was 30° and the second base angle $\beta_2$ was 70°. Note that the three second linear prism portions 12 had the same shape and size, they were arranged periodically in the direction orthogonal to the lengthwise direction, and the base angle parts of adjacent linear prism portions 12 were provided in contact with one another.

Using the optical adjusting sheet thus produced, the liquid crystal display device 100 and the backlight unit 6 in Inventive Example 1 were produced. The optical members other than the optical adjusting sheet 1 in the liquid crystal display device 100 in Inventive Example 1 were the same as those used for the conventional device. More specifically, the light guide plate 3 was for example made of polycarbonate. In this example, the light guide plate 3 had such an output characteristic that the angle formed between the direction in which the luminance of the light 51 from the output surface 3a of the light guide plate 3 is maximized (the direction of the luminance peak light) and the direction with respect to the normal direction of the output surface 3a was 70°. Therefore, when the output light 51 from the light guide plate 3 was incident to the optical adjusting sheet 1, the light 51 was refracted at the lower surface of the base member 10 of the optical adjusting sheet 1 and the inclination angle θ of the traveling direction of the luminance peak light for the light 52 with respect to the normal direction of the surface of the base member 10 was about 36°. More specifically, the inclination angle θ of the travelling direction of the luminance peak light 52 was arranged to be slightly greater than the angle between the inclination direction of the flat surface 13c of the linear optical member 13 of the optical adjusting sheet 1 and the normal direction of the surface of the base member 10 (90°−$\beta_1$=32.29°).

A sheet produced by vapor-depositing silver on a PET film was used for the reflection sheet 4. A bead-coated PET film was used for the diffusion sheet 5 and its thickness was 70 μm and its haze was 30%.

The liquid crystal display device 100 thus produced in Inventive Example 1 was measured for its front surface luminance using a luminance meter. The backlight unit 6 in Inventive Example 1 was subjected to sensory evaluation by visual inspection. More specifically, the tinge of output light from the backlight unit was visually inspected mainly from the front surface, and the homogeneity of the color of the output light was examined.

Figure 1:
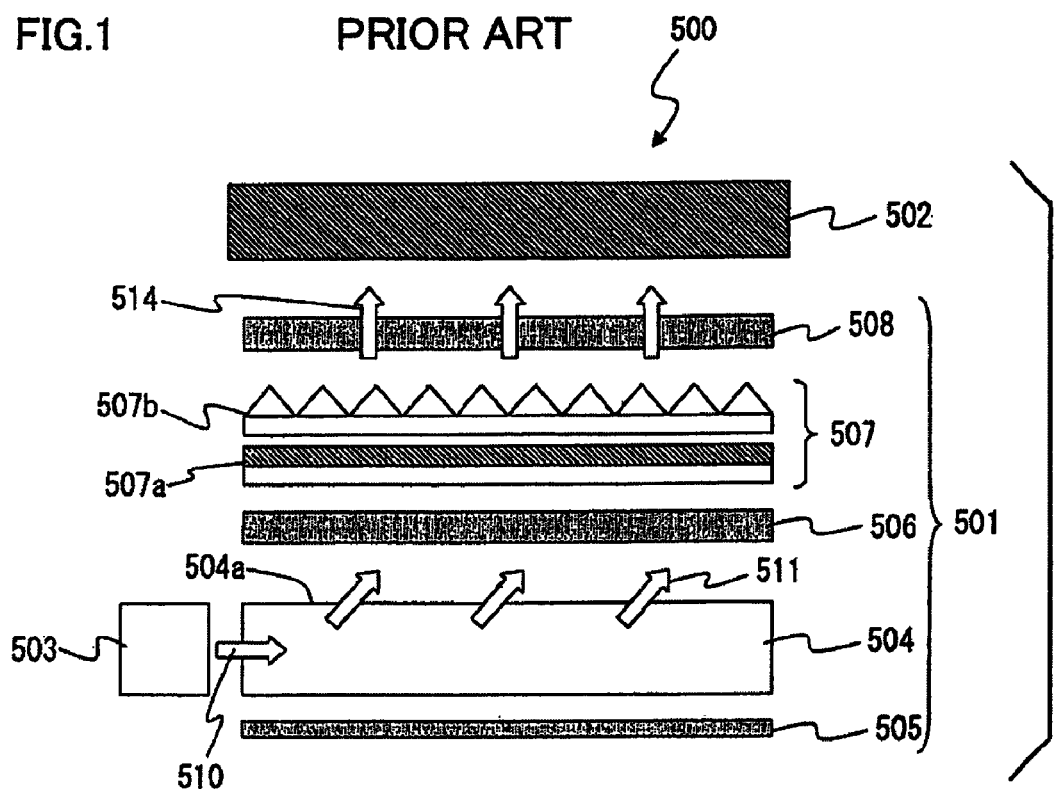
FIG. 1 is a schematic view of a liquid crystal display device.

In this example, a conventional liquid crystal display device 500 (Comparative Example 1) shown in FIG. 1 was also subjected to the above-described evaluation for the purpose of comparison. Note that in the liquid crystal display device 500 in Comparative Example 1, the shape of a section of a prism member formed at the prism sheets 507a and 507b orthogonal to the lengthwise direction of the prism member was an isosceles triangle in which the width of the base was 30 μm, the height was 15 μm, and the vertical angle was 90°. The base member 507c of each of the prism sheets 507a and 507b was made of a PET film and the prism member 507d was made of ultraviolet curing type acrylic resin. A lower diffusion sheet 506 was a bead-coated PET film having a thickness of 70 μm and a haze of 85%. The optical members except for the prism sheet group 507 and the lower diffusion sheet 506 were the same as those used in the liquid crystal display device 100 in Inventive Example 1.

Figure 3:
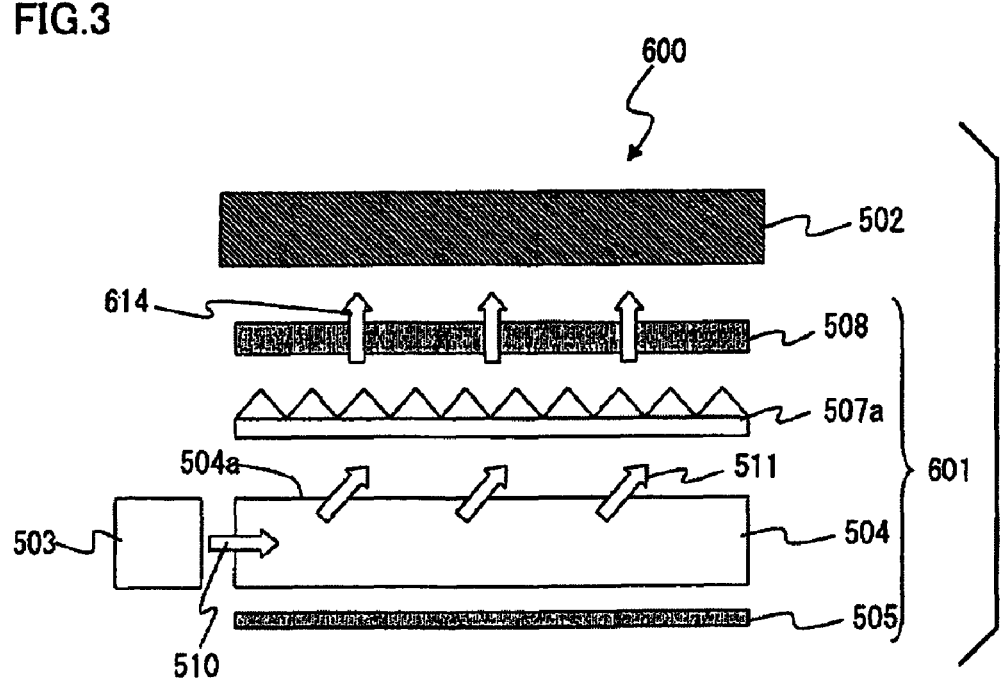
FIG. 3 is a schematic view of another liquid crystal display device different from the liquid crystal display device shown in FIG. 1.
Figure 4:
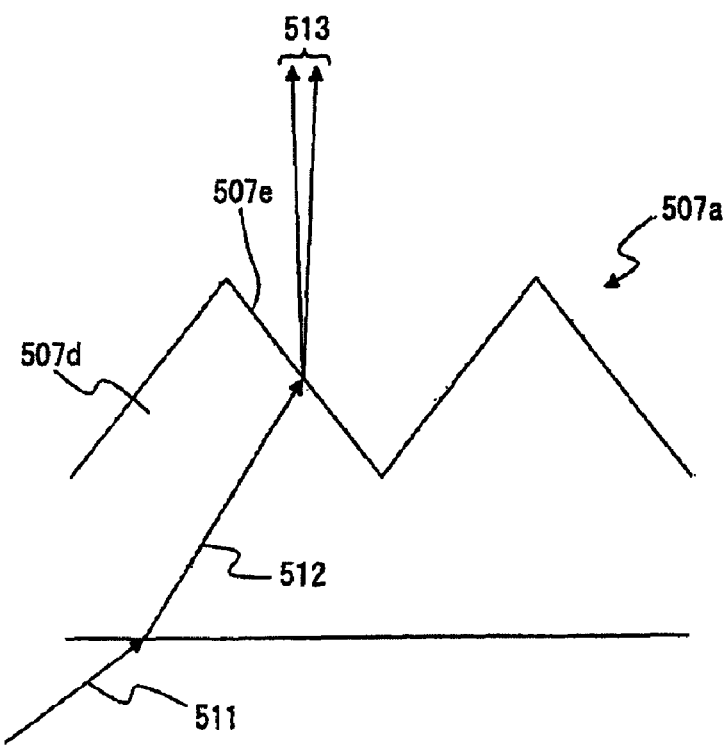
FIG. 4 is a view showing the color separation of outgoing light.

Furthermore, a liquid crystal display device 600 (Comparative Example 2) having the structure as shown in FIG. 3 was also subjected to the above-described evaluation for the purpose of comparison. Note that the liquid crystal display device 600 in Comparative Example 2 shown had a single conventional prism sheet 507a shown in FIG. 2 instead of the optical adjusting sheet 1 in the liquid crystal display device 100 in Inventive Example 1, Other than using the conventional prism sheet 507a for the optical adjusting member, the device had the same structure as that of the liquid crystal display device 100 in Inventive Example 1.

The result of evaluation is given in the following Table 1, In Table 1, the number of optical sheets (optical adjusting sheets and diffusion sheets) provided between the light guide plate and the liquid crystal panel is included. Note that front side luminance is expressed with respect to the front side luminance of Comparative Example 1 as a reference (100%). Evaluation marks ⊚ and × for the homogeneity of the colors in Table 1 were based on the following criteria. The evaluation result of Inventive Example 2 as an example of a second embodiment that will be described is also given in the following Table 1.

⊚: The tinge of output light from the backlight unit (that corresponds to 55 in FIG. 7) was white which is the same as that of light emitted from the light source (that corresponds to 50 in FIG. 7), and the difference between them could not be determined by visual inspection.

×: Output light from the backlight unit had a red tinge, a yellow tinge or the like that was determined by visual inspection.

TABLE 1

| | front side luminance | homogeneity of color | number of optical sheets |
|---|---|---|---|
| Inventive Example 1 | 107% | ⊚ | 2 |
| Inventive Example 2 | 112% | ⊚ | 2 |
| Comparative Example 1 | 100% | ⊚ | 4 |
| Comparative Example 2 | 73% | x | 2 |

As can be seen from Table 1, in the liquid crystal display device in Inventive Example 1, the front side luminance can be improved and the number of optical sheets can be reduced as compared to the liquid crystal display device in Comparative Example 1, In other words, in the liquid crystal display device in Inventive Example 1, the optical characteristic can be improved while reducing the thickness and cost of the device. As can be see from Table 1, in the liquid crystal display device in Inventive Example 1, the front side luminance and color homogeneity can be improved as compared to the liquid crystal display device in Comparative Example 2.

In the above-described optical adjusting sheet according to the first embodiment, a plurality of second linear prism portions 12 have the same shape and size, but they are not limited to the arrangement. The plurality of second linear prism portions 12 may have similar shapes to one another. In this case, the light collecting surfaces 12f and correction surfaces 12r of the plurality of second prism portions 12 are parallel to one another, so that the same effects are obtained.

In the liquid crystal display device and the illumination device according to the first embodiment, a diffusion sheet is further provided on the optical adjusting sheet in order to improve luminance variance in output light from the optical adjusting sheet, while the invention is not limited to this arrangement. When the quality of output light from the optical adjusting sheet is sufficiently high (when the luminance variance is restrained as much as possible) or when the invention is applied to a use that does not require high quality display performance, the diffusion sheet is not necessary.

In the above-described liquid crystal, display device and the illumination device according to the first embodiment, a reflection sheet is provided on the side of the light guide plate opposite to the optical adjusting sheet side, while the invention is not limited to this arrangement. For example, when the surface of the light guide plate on the opposite side to the side of the optical adjusting sheet can provide sufficient reflection (such as in an irregular structure), the reflection sheet is not necessary.

Second Embodiment

In the optical adjusting sheet according to the invention, the number of the second linear prism portions that form the step-wise surface of the linear optical member, the position and the area ratio of the light collecting surface and the correction surface at the step-wise surface or the inclination angles of the light collecting surface and the correction surface are adjusted as desired, so that the optical characteristic including the luminance and chromatic dispersion of output light from the optical adjusting sheet can be well balanced.

In the optical adjusting sheet according to the second embodiment, the number of the second linear prism portions, the shape and the like are different from those in the first embodiment so that the amount of light incident to the light collecting surface is relatively greater than the correction surface. The other structure is the same as that in the first embodiment and the same materials may be employed.

Figure 8:
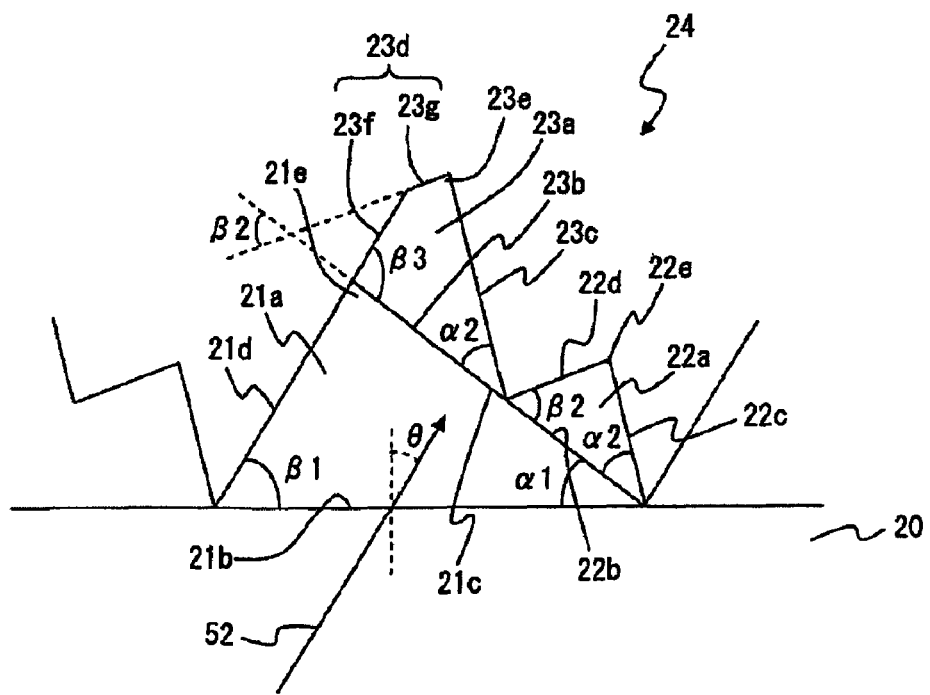
FIG. 8 is an enlarged sectional view of a linear optical member in the second embodiment.

FIG. 8 is an enlarged sectional view of the linear optical member of an optical adjusting sheet according to the second embodiment. The linear optical member 24 has an approximately triangular section orthogonal to the lengthwise direction, and one surface along the lengthwise direction (the surface including the base 21*b*, hereinafter also referred to as "base") is in parallel and in contact with the surface of a base member 20. More specifically, the linear optical member 24 is provided on the base member 20 so that; its base is opposed to the surface of the base member 20. Note that the incident light 52 is luminance peak light.

A section of the linear optical member 24 orthogonal to the lengthwise direction includes a first sectional part 21*a* and two second sectional parts 22*a* and 23*a* in different shapes provided on one side of the first sectional part 21*a*. More specifically, the two second linear prism portions (corresponding to the second sectional parts 22*a* and 23*a*) in different shapes are formed on the first linear prism portions (corresponding to the first sectional part 21*a*). The two sectional parts 22*a* and 23*a* are provided so that their base angle parts are in contact with each other.

The first sectional part 21*a* is defined by a base 21*b* (first side) and two inclined sides 21*c* (second side) and 21*d* (third side) that extend from the ends of the base 21*b* at prescribed angles ($\alpha_1$ and $\beta_1$ in FIG. 8). In FIG. 8, the shape of the first sectional part 21*a* is the same as that in the first embodiment, while the shape may be different.

Note that in FIG. 8, the relation between the inclination angle of the inclined side 21*d* with respect to the normal direction of the surface of the base member 20 and the inclination angle $\theta$ of the traveling direction of luminance peak light 52 is the same as that according to the first embodiment in FIG. 6. More specifically, the inclination direction of the surface of the linear optical member 24 including the inclined side 21*d* is approximately parallel to the traveling direction of the luminance peak light 52. More specifically, the inclination angle $\beta_1$ with respect to the surface of the base member 20 is slightly greater than the inclination angle (90°−θ) of the luminance peak light 52 with, respect to the surface of the base member 20.

The second sectional part 22*a* positioned on the side of the first base angle $\alpha_1$ of the first sectional part 21*a* is defined by a base 22*b* (fourth side) in parallel and in contact with the inclined side 21*c* (second side) and two inclined sides 22*c* and 22*d* that extend at prescribed angles $\alpha_2$ and $\beta_2$ from the ends of the base 22*b*. Note that in the example, the shape of the second sectional part 22*a* is similar to that of the second sectional part 12*a* in FIG. 6. The area of the second sectional part 22*a* positioned on the side of the first base angle $\alpha_1$ is greater than the area of the second sectional part 12*a* in FIG. 6.

Note that the surface of the second linear prism portion including the inclined side 22*c* (fifth or sixth side) is mainly a surface that refracts incident light in the thickness-wise direction of the optical adjusting sheet, i.e., a surface (light collecting surface) capable of collecting the incident light. On the other hand, the surface including the other inclined side 22*d* (fifth or sixth side) is mainly a surface (correction surface) capable of restraining the color separation. More specifically, the area of the light collecting surface of the second linear prism portion positioned closest to the side of the base angle $\alpha_1$ is greater than that in FIG. 6.

In this way, the light collecting surface of the second linear prism portion positioned closest to the base angle ail side is set wider, so that the use efficiency of incident light can be improved and the luminance can be increased. This is for the following reason. Light incident to the surface including the second side 21*c* in FIG. 8(hereinafter referred also to as "second linear prism forming surface"), i.e., light incident to the step-wise surface includes a light component other than the luminance peak light 52. The intensity of the light (luminance) passing the second linear prism forming surface varies depending on the position of the second linear prism forming surface through which the light passes. More specifically, the intensity of light passing the second linear prism forming surface increases toward the base angle $\alpha_1$ side of the first linear prism portion. Light incident to the second linear prism portion positioned closer to the base angle $\alpha_1$ side has stronger intensity (higher illuminance). Therefore, as in the example, by widening the light collecting surface of the second linear prism portion positioned closest to the base angle $\alpha_1$ side, light with higher intensity can be collected, so that the use efficiency of incident light can be improved and the luminance of output light can be improved.

On the other hand, as shown in FIG. 8, the second sectional part 23*a* positioned on the side of the vertical angle 21*e* is in an approximately triangular shape defined by a base 23*b* (fourth side) in parallel and in contact with the inclined side 21*c* (second side) and two inclined sides 23*c* and 23*d* that extend at prescribed angles $\alpha_2$ and $\beta_3$ in FIG. 8 from the ends of the bases 23*b*. The inclined side 23*d* (fifth or sixth side) is formed by two sides 23*f* and 23*g*, and the inclined side 23*d* is bent in an outwardly raised shape from the second sectional part 23*a*.

Among the two sides 23f and 23g that form the inclined side 23d, the side 23f extends parallel to the inclined side 21d from a part of the vertical angle 21e. Therefore, the angle P3 (second base angle) between the base 23b and the inclined side 23d equals $\alpha_1+\beta_1$. The other side 23g is formed parallel to the inclined side 22d. More specifically, in this example, the inclined side 23c and the sides 23f and 23g are parallel to the inclined side 22c and the inclined side 21d and the inclined side 22d.

Note that at the second sectional part 23a, the surface of the linear optical member 24 including the inclined side 23c is a surface (light collecting surface) capable of collecting the incident light. On the other hand, the side 23f is parallel to the inclined side 21d, so that the inclination direction of the surface of the linear optical member 24 including the side 23f is approximately parallel to the luminance peak light 52. Therefore, the effect of the refraction and reflection of the incident light is small. The surface of the linear optical member 24 including the other side 23g is mainly a surface (correction surface) capable of restraining the color separation. Therefore, in this example, the shape of the second sectional part 23a is a shape produced by increasing the area of the light collecting surface of the second linear prism portion as much as possible, while the area of the correction surface is as small as possible.

Inventive Example 2

An optical adjusting sheet having a linear optical member 24 having the structure shown in FIG. 8 was produced and evaluated for the optical characteristic similarly to Inventive Example 1.

More specifically, by a manufacturing method described in conjunction with the first embodiment, the optical adjusting sheet in Inventive Example 2 having the linear optical members shown in FIG. 8 was produced.

The first and second angles $\alpha_1$ and $\beta_1$ were 39.14° and 57.71°, respectively, and the base 21b had a length of 35 μm. The first base angle $\alpha_2$ and the second base angle $\beta_2$ were 30° and 70°, respectively. The base 22b was as long as about 14.92 μm, that was longer than the base 12b (about 10.44 μm) in Inventive Example 1. More specifically, the area of the second sectional part 22a was greater than the area of the second sectional part 12a in FIG. 6. The first base angle $\alpha_2$ was 30°, and the second base angle $\beta_3$ was 96.85°. The other structure and materials were the same as those in Inventive Example 1.

The thus produced optical adjusting sheet was mounted to the liquid crystal display device 100 and the backlight unit 6 shown in FIG. 7. instead of the optical adjusting sheet 1, and the liquid crystal display device and the backlight unit in Inventive Example 2 were completed. The structures of the liquid crystal display device and the backlight unit were the same at those in Inventive Example 1 except for the optical adjusting sheet. The liquid crystal display device and the backlight thus produced were measured for the front side luminance using a luminance meter. Sensory evaluation of the tinge was carried out to by visual inspection. The result is given in Table 1.

As can be understood from Table 1, the front side luminance was 112% using the optical adjusting sheet in Inventive Example 2 that was even higher than the result (107%) in Inventive Example 1, This is probably because in the optical adjusting sheet in this example, the light collecting surface of the second linear prism part positioned closest to the base angle side of the first linear prism part (the liner member corresponding to the second sectional part 22a) was made wider than that in Inventive Example 1 as described above. In the optical adjusting sheet in this example, as described above, the correction surface of the second linear prism part corresponding to the second sectional part 23a was made smaller, and as for the color homogeneity, there was no significant difference between Inventive Examples 1 and 2 as given in Table 1, More specifically, it was confirmed that sufficient optical performance was obtained when the optical adjusting sheet having such a structure was used in various kinds of illumination devices such as a backlight for a liquid crystal display.

Third Embodiment

The inventors have studied about sectional shapes of the first and second liner prism portions so that luminance peak light incident to the light collecting surface can be output from the optical adjusting sheet to the outside without total reflection. The inventors found that an optical characteristic such as transmission of the luminance peak light can be controlled by adjusting the sectional shapes of the first and second liner prism portions.

Figure 9:
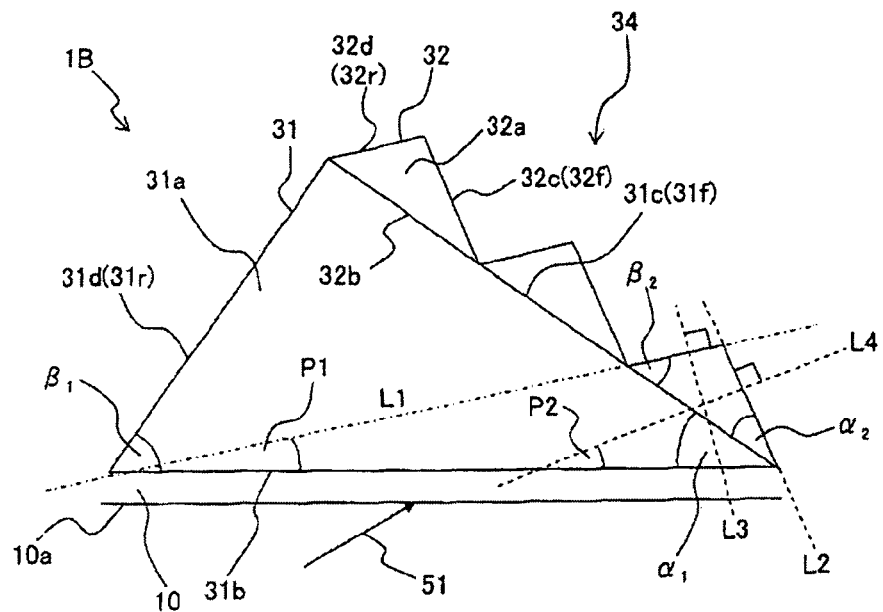
FIG. 9 is an enlarged sectional view of a linear optical member according to a third embodiment of the invention.

FIG. 9 is an enlarged sectional view of a linear optical member in an optical adjusting sheet 1B according to a third embodiment of the invention. As shown in FIG. 9, the linear optical member 34 has the same structure as the linear optical member 13 according to the first embodiment.

Now, assume that luminance peak light 61 output from the output surface 3a of the light guide plate 3 (see FIG. 7) is incident to the base 10a. The base member 10 and the linear optical member 34 are both made of an optical material having a refractive index of $n_1$. The base member 10 and the linear optical member 34 are surrounded by the air (refractive index $n_0=1.0$).

Similarly to the first embodiment, a first side 31b, a second side 31c and a third side 31d at the first sectional part 31a of the first linear prism portion 31 and a fourth side 32b, a fifth side 32c and a sixth side 32d at the second sectional part 32a of the second linear prism portion 32 are defined. Surfaces including the fifth side 32c and the sixth side 32d are a light collecting surface 32f and a correction surface 32r, respectively. A line extended from the sixth side 32d is L1 and a line extended from the fifth side 32c is L2. A line orthogonal to L1 is L3, and a line orthogonal to L2 is L4. The line L1 and the first side 31b cross at an angle P1 and L4 and the first side 31b cross at an angle P2. In this case, the angles P1 and P2 are represented as follows:

$$P_1=\beta_3-\alpha_1$$

$$P_2=90-\alpha_1-\alpha_2 \quad (1)$$

Figure 10:
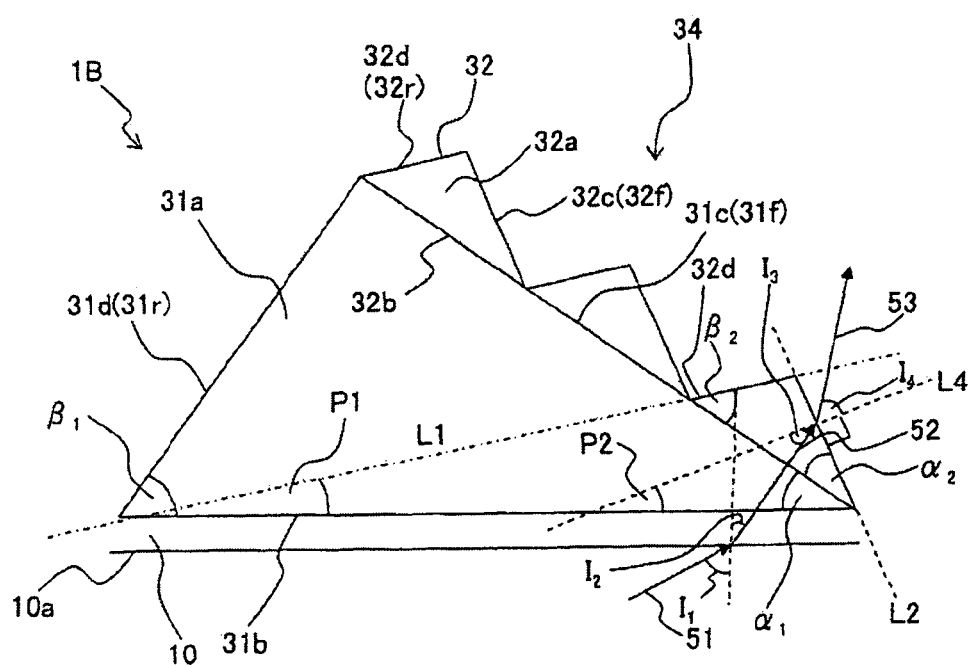
FIG. 10 is a schematic view showing the optical path of light transmitted through the linear optical member according to the third embodiment.

As shown in FIG. 10, luminance peak light 51 comes into the base surface 10a and is refracted at the interface (first interface) between the air and the base surface 10a, At the time, the incident angle and refraction angle of the luminance peak light 51 with respect to the first interface are $I_1$ and $I_2$ (degree), respectively. The luminance peak light 52 refracted at the first interface propagates inside the optical adjusting sheet 1B and travels toward the interface (second interface) between the light collecting surface 32f and the air. Luminance peak light 53 refracted at the second interface is output from the optical adjusting sheet 1B to the outside. The incident angle and the refraction angle of the luminance peak light at the second interface are $I_3$ and $I_4$ (degree), respectively.

The incident angle $I_1$ and the refraction angle $I_2$ are represented by the following expression based on Snell's law.

$$n_0 \sin I_1 = n_1 \sin I_2 \quad (2)$$

Similarly, the incident angle $I_3$ and the refraction angle $I_4$ are represented by the following expression.

$$n_1 \sin I_3 = n_0 \sin I_4 \quad (3)$$

where the condition in which the luminance peak light 52 is not totally reflected at the light collecting surface 32f, i.e., the condition in which the luminance peak light 53 is output from the optical adjusting sheet 1B to the outside is represented by the following expression for the refractive index of the air $n_0 = 1.0$.

$$0 \leq \sin I_3 \leq 1/n_1 \quad (4)$$

where the magnitude of the incident angle $I_3$ equals $\alpha_1 + \alpha_2 - I_2$ and therefore, Expression (4) can be rewritten as follows.

$$0 \leq \sin(\alpha_1 + \alpha_2 - I_2) \leq 1/n_1 \quad (5)$$

where the refraction angle $I_2$ is uniquely determined based on the incident angle $I_1$ and the refractive index $n_1$ of the base member 10 and the linear optical member 34. More specifically, once the material of the base member 10 and the linear optical member 34 is determined (once the refractive index $n_1$ is determined) and the incident angle $I_1$ is determined, the refractive index $I_2$ is determined by Expression (2). The range of the angle $(\alpha_1 + \alpha_2)$ that satisfies Expression (5) can be set for the refraction angle $I_2$ thus determined.

Now, the condition (requirement) to be satisfied by the angle $(\alpha_1 + \alpha_2)$ for an arbitrary incident angle $I_1$ will be considered. When the maximum value for the refraction angle $I_2$ that satisfies Expressions (2) and (5) is $I_{2max}$ (degree), the following expression is derived from Expressions (2) and (5).

$$\sin I_{2max} = 1/n_1$$

$$\sin(\alpha_1 + \alpha_2 - I_{2max}) = 1/n_1 \quad (6)$$

Therefore, the angle $(\alpha_1 + \alpha_2)$ must satisfy the following conditional expression so that the luminance peak light 52 is incident to the second interface at an angle equal to or less than the critical angle and the luminance peak light 53 is output to from the optical adjusting sheet 1B to the outside without total reflection.

$$\alpha_1 + \alpha_2 \leq 2 \cdot I_{2max} \quad (7)$$

Now, the condition in which the luminance peak light 52 is incident to the light collecting surface 32f will be considered. In order to allow the luminance peak light 52 propagating inside the optical adjusting sheet 1B to come into the light collecting surface 32f, 0 (degree) $\leq I_3 \leq$ 90 (degree) must be satisfied. From this, the following conditional expression is derived.

$$0 \leq I_3 = I_2 - \alpha_1 + \alpha_2 \leq I_2 + 90$$

$$I_2 \leq \alpha_1 + \alpha_2 \leq I_2 + 90 \quad (8)$$

Figure 11:
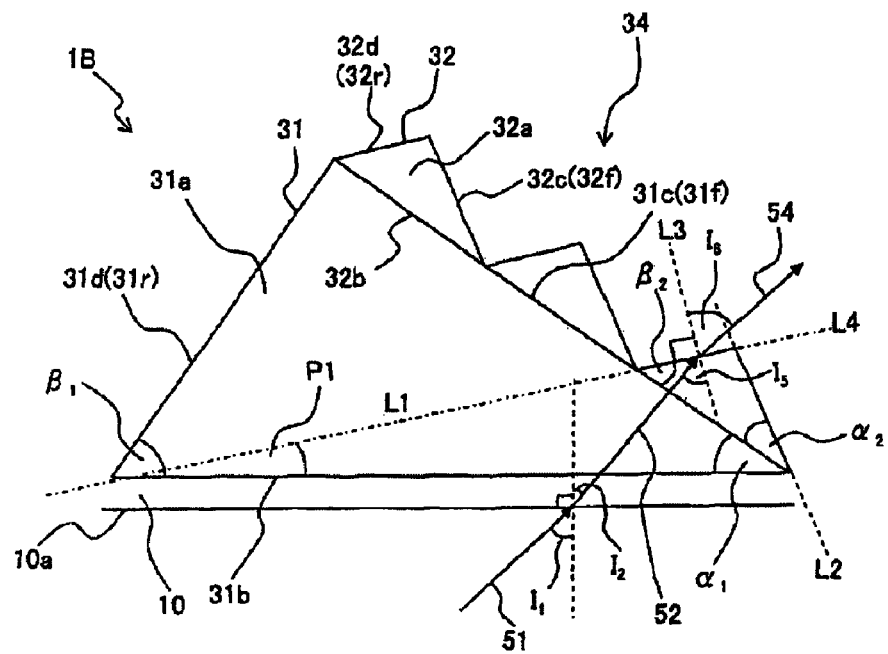
FIG. 11 is another schematic view showing the optical path of light transmitted through the linear optical member different from the view shown in FIG. 10.

Now, with reference to FIG. 11, the condition in which the luminance peak light 52 is incident to the correction surface 32r will be considered. The incident angle and refraction angle of the luminance peak light 52 at the correction surface 32r are $I_5$ and $I_6$ (degree), respectively. In order to allow the luminance peak light 52 propagating inside the optical adjusting sheet 1B to come into the correction surface 32r, 0 (degree) $\leq I_5 \leq$ 90 (degree) must be satisfied. Here, $I_5 = \beta_2 - \alpha_1 + I_2$, and therefore the following conditional expression is derived.

$$0 \leq I_5 = \beta_2 - \alpha_1 + I_2 \leq 90$$

$$-I_2 \leq \beta_2 - \alpha_1 \leq 90 - I_2 \quad (9)$$

In summary, the condition in which the luminance peak light 52 is not totally reflected at the light collecting surface 32f, i.e., the condition in which the luminance peak light 53 is output from the optical adjusting sheet 1B to the outside is represented by Expression (5). However, in order to allow incident light at the first interface at an arbitrary incident angle to come into the second interface at an angle not more than the critical angle and output from the optical adjusting sheet 1B to the outside without total reflection at least at the light collecting surface, the angle $(\alpha_1 + \alpha_2)$ must satisfy Expression (7). Furthermore, the condition in which the luminance peak light 52 comes into the light collecting surface 32f is represented by Expression (8), and the condition in which the luminance peak light 52 comes into the correction surface 32r is represented by Expression (9).

Here, similarly to Inventive Example 1, assume that the incident angle $I_1$ of the luminance peak light 51 is 70 degree. The refractive index $n_1$ of the optical adjusting sheet 1B is 1.60 and therefore, $I_2 = 35.97$ degree from the above Expression (2). By substituting the result to Expression (5), $\alpha_1 + \alpha_2 \leq 74.65$ results, and by substituting the result to Expression (8), $35.97 \leq \alpha_1 + \alpha_2 \leq 125.97$ results. By combining these expressions, $35.97 \leq \alpha_1 + \alpha_2 \leq 74.65$ results. Furthermore, $-35.97 \leq \beta_2 - \alpha_1 \leq 54.03$ results from Expression (9).

When the optical adjusting sheet 1B has the same size and shape as those of the optical adjusting sheet 1 in Inventive Example 1, the first base angle $\alpha_1$ is 39.14 degree and the second base angle $\beta_1$ is 57.71 degree. The first base angle $\alpha_2$ is 30 degree and the second base angle $\beta_2$ is 70 degree. At the time, the angle $(\alpha_1 + \alpha_2)$ is 69.14 degree, and the angle $(\beta_2 - \alpha_1)$ is 30.86 degree. Therefore, in the optical adjusting sheet 1B, the angles $(\alpha_1 + \alpha_2)$ and $(\beta_2 - \alpha_1)$ satisfy the above-described conditions ($35.97 \leq \alpha_1 + \alpha_2 \leq 74.65$ and $-35.97 \leq \beta_2 - \alpha_1 \leq 54.03$).

Here, from Expression (7), $\alpha_1 + \alpha_2 \leq 71.94$ results. This means that when the optical adjusting sheet 1B is produced using an optical material with a refractive index of 1.60, and $\alpha_1 + \alpha_2$ is set to 71.94 degree or less, incident luminance peak light can be output from the optical adjusting sheet 1B to the outside without total reflection at the light collecting surface regardless of the incident angle of the luminance peak light.

When incident angle $I_1$ of the luminance peak light 51 is set to 70 degree, the angles $\alpha_1$ and $\alpha_2$ are set so that $\alpha_1 + \alpha_2$ not more than 74.65 degree. In this way, incident luminance peak light can be refracted at the light collecting surface 32f without total reflection, so that light can efficiently be extracted from the optical adjusting sheet 1B. Furthermore, actual incident light to the optical adjusting sheet 1B has an angular distribution peaked at the angle of the luminance peak light, while incident light at an arbitrary incident angle can be refracted without total reflection at the light collecting surface 32f by setting the angles $\alpha_1$ and $\alpha_2$ so that $\alpha_1 + \alpha_2$ is not more than 71.94 degree. Consequently, light can be extracted efficiently from the optical adjusting sheet 1B.

In this way, the shape of the optical adjusting sheet is adjusted so that total reflection is not caused at the light collecting surface, and the front side luminance of the optical adjusting sheet can be increased. Here, the light collecting surface contributes to the front side luminance, i.e., the amount of light output to the normal direction of the base surface of the base member (base member surface). Therefore, it is important to adjust the shape of the optical adjusting sheet so that total reflection is not caused at least at the light collecting surface in order to efficiently improve the front side luminance. Stated differently, total reflection could be caused in some cases at the correction surface and the flat surface in course of adjustment.

In the above-described examples, combinations of prescribed angles such as the angles $\alpha_1$, $\alpha_2$, $\beta_1$, $\beta_2$, and the like are described by way of illustration, but the invention is not limited to the described combinations. If the above-described conditions are satisfied, the invention can be applied to optical adjusting sheets having combinations of arbitrary angles. Note that the angles $\alpha_2$ and $\beta_2$ do not have to be set so that the two angles γ in FIG. 6 are always substantially the same.

In the foregoing description, the base member of the optical adjusting sheet and the linear optical members are both made of an optical material with the refractive index $n_1$, but the invention is not limited to the arrangement. The refractive index $n_b$ of the base member may be different from the refractive index $n_1$ of the linear optical member. The optical adjusting sheet 1B in FIG. 12A has the base member 10 and the linear optical member 34 both made of an optical material with the refractive index $n_1$. On the other hand, an optical adjusting sheet 1C in FIG. 12B has the linear optical member 34 of an optical material with the refractive index $n_1$ and a base member 110 of an optical material with the refractive index nb ($n_b \neq n_1$).

Figure 12A:
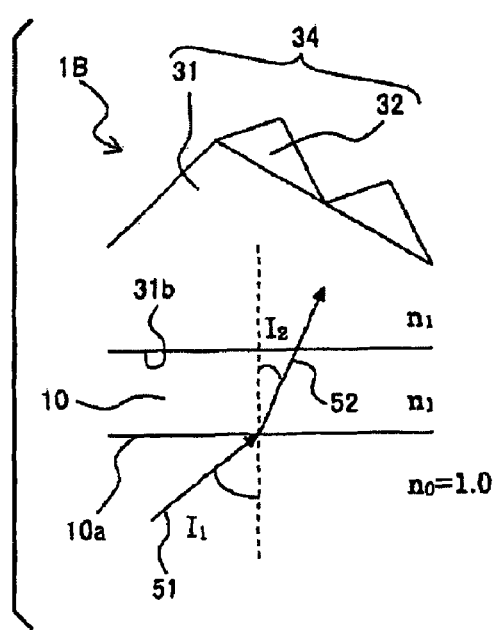
FIG. 12A is a schematic sectional view of a linear optical member when the refractive indexes of the base member and the linear members are the same.

As described above, the light 51 is incident to the interface (base surface 10a) between the base member 10 and the air at the incident angle $I_1$ in FIG. 12A the light 51 is refracted at the interface between the base member 10 and the air. The refraction angle $I_2$ here is represented by the following Expression (10) based on Snell's law.

$$\sin I_2 = (\sin I_1)/n_1 \quad (10)$$

where the base member 10 and the linear optical member 34 are made of optical materials with the same refractive index $n_1$. Therefore, light 52 traveling inside the base member 10 advances straightforward through the interface between the base member 10 and the first linear prism portion 31 (the surface that defines the base 31b of the first linear prism portion 31).

Figure 12B:
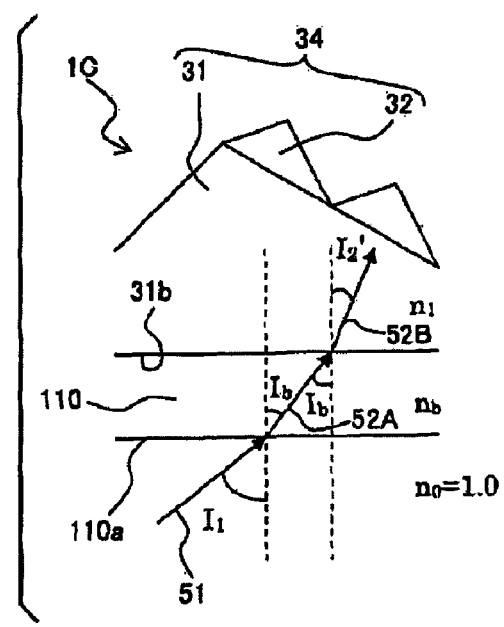
FIG. 12B is a schematic sectional view of a linear optical member when the refractive indexes of the base member and the linear members are different.

On the other hand, the light 51 incident to the interface (base surface 110a) between the base member 110 and the air in FIG. 12B is refracted at the interface between the base member 110 and the air. The refraction angle $I_b$ here is represented by the following Expression (11).

$$\sin I_b = (\sin I_1)/n_b \quad (11)$$

The base member 110 (with the refractive index $n_b$) and the linear optical member 34 (with the refractive index $n_1$) are made of optical materials with different refractive indexes. Therefore, light 52A refracted at the interface between the base member 110 and the air is refracted at the interface between the base member 110 and the first linear prism portion 31(the surface that defines the base 31b of the linear prism part 31). Here, when the upper and lower surfaces are parallel like the base member 110 shown in FIG. 12B, the refraction angle $I_2'$ at the interface between the base member 110 and the first linear prism portion 31 is represented by the following Expression (12).

$$\sin I_2' = (n_b/n_1)\sin I_b \quad (12)$$

Substitution of Expression (11) into Expression (12) leads to $\sin I_2' = (\sin I_1)/n_1$ which is identical to Expression (10). As can be understood, $I_2'$ is equal to the refraction angle $I_2$ when light is directly incident from the air to a medium with the refractive index $n_1$. Therefore, when the base member and the linear member have different refractive indexes like the optical adjusting sheet 1C, $n_1$ is set as the refractive index of the linear member and $I_2$ is set as the refraction angle at the interface between the base member and the linear member, so that the expression in the above description can be applied as it is.

Fourth Embodiment

The inventors examined the optical characteristic of an optical adjusting sheet while changing the number of the second linear prism portions in order to obtain an effective range of the number of second linear prism portions for the optical adjusting sheet as a fourth embodiment. More specifically, the front side luminance was measured using a luminance meter, and sensory evaluation of the tinge was carried out by visual inspection. The optical adjusting sheet according to the embodiment includes a plurality of linear members having optical transparency on the base member, a section of each of the linear members orthogonal to the length-wise direction is an approximately triangle, one of the three sides that define the section is in parallel and in contact with the surface of the base member, one of the other two sides is step-wise and refracts incident light inclined to the base surface of the base member in the direction orthogonal to the base member, and the other side causes correction light that alleviates color separation. As the result of measurement as follows, the number of steps (the number of the second linear prism portions) is preferably from two to nine. This will be described in the following paragraphs.

Figure 13:
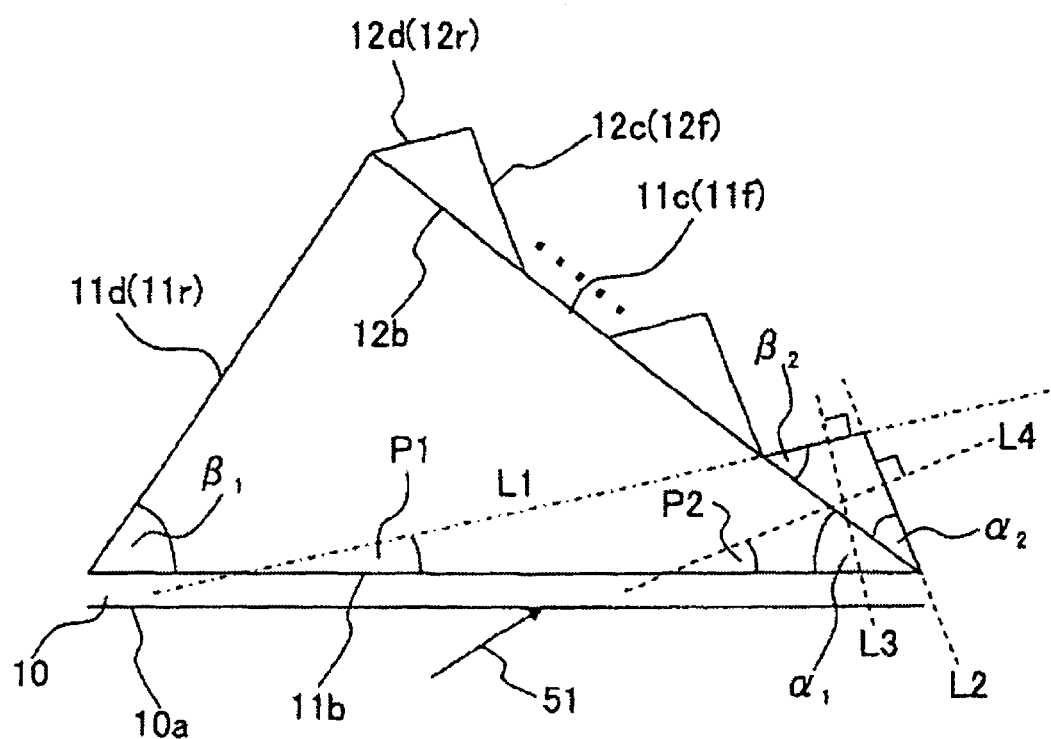
FIG. 13 is a schematic view of a linear optical member according to a fourth embodiment of the invention.

In the fourth embodiment, optical adjusting sheets in Inventive Examples 3 to 9 were produced while the number of second linear prism parts were varied in the range from 1 to 15 and compared for their optical characteristics. As shown in FIG. 13, the optical adjusting sheets in Inventive Examples 3 to 9 are provided with second linear prism portions with the first and second base angles $\alpha_1$ and $\beta_2$ of 30 degree and 70 degree, respectively at a side 11c, and these second linear prism portions, have the same shape. The first linear prism portion is a triangular linear prism part in which the first and second base angles $\alpha_1$ and $\beta_1$ are 39.14 degree and 57.71 degree, respectively, and the base 11b in contact with the base member of each optical adjusting sheet has a length of 35 μm. In the following examples, the second linear prism portions were changed in size, i.e., changed among similar shapes depending on the number of the second linear prism parts provided on and in contact with the side 11c of the first linear prism portion. In the following paragraphs, the structures and optical characteristics of the optical adjusting sheets in Inventive Examples 3 to 9 will be described.

Inventive Example 3

Figure 14A:
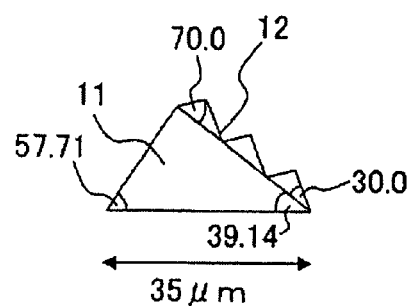
FIGS. 14A and 14B are enlarged sectional views of a linear optical member in Inventive Example 3 of the third embodiment.
Figure 14B:
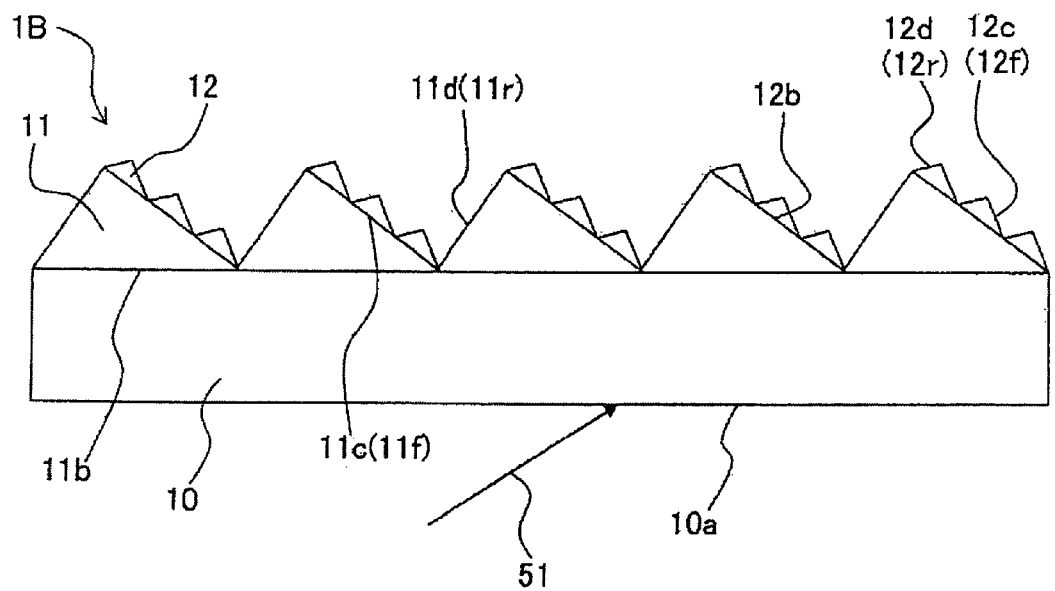

As shown in FIGS. 14A and 14B, an optical adjusting sheet ID in Inventive Example 3 had three second linear prism portions 12 on the inclined side 11c of the first linear prism portion 11 similarly to the optical adjusting sheet 1 in Inventive Example 1, More specifically, the number of approximately triangular members that form the second sectional parts is three. The optical adjusting sheet 1D had a front side luminance of 100% or more, the color separation was sufficiently restrained, and no coloring of output light was observed by visual inspection.

Inventive Example 4

Figure 15A:
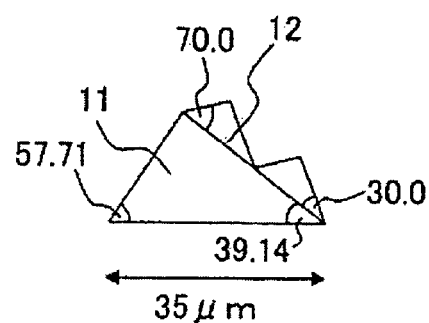
FIGS. 15A and 15B are enlarged sectional views of a linear optical member in Inventive Example 4 of the third embodiment.
Figure 15B:
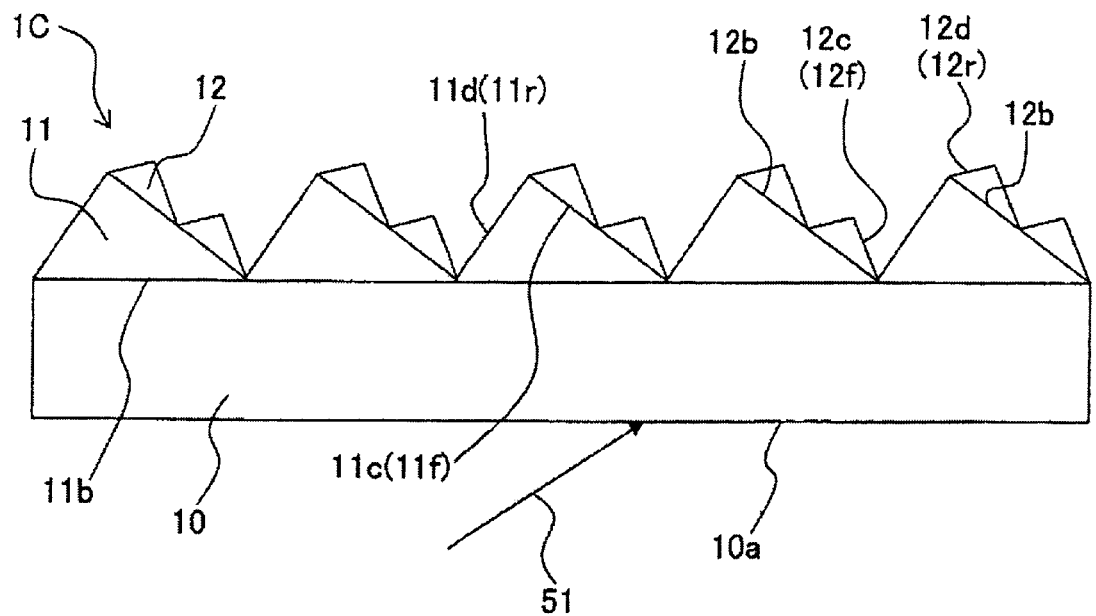

As shown in FIGS. 15A and 15B, an optical adjusting sheet 1E in Inventive Example 4 had two second linear prism portions 12 on the inclined side 11c of the first linear prism portion 11. More specifically, the optical sheet 11E had two approximately triangular members that form the second sectional parts. The front side luminance of the optical adjusting sheet 1E was 100% or more, the color separation was sufficiently restrained, and no coloring of output light was observed by visual inspection. In. Inventive Example 4, the correction surface was provided on the closer side to the first base angle $\alpha_1$ than in Inventive Example 7 that will be described, and this is probably the reason why both the front side luminance and the color separation restraining effect were secured. The light collecting surface and the correction surface were further well balanced and the above Inventive Example 2 resulted. In Inventive Example 2, the two linear prism parts had different shapes during adjustment.

Inventive Example 5

Figure 16A:
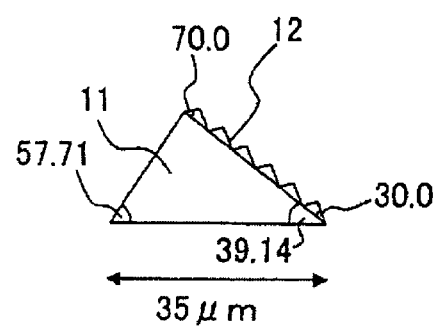
FIGS. 16A and 16B are enlarged sectional views of a linear optical. member in Inventive Example 5 of the third embodiment.
Figure 16B:
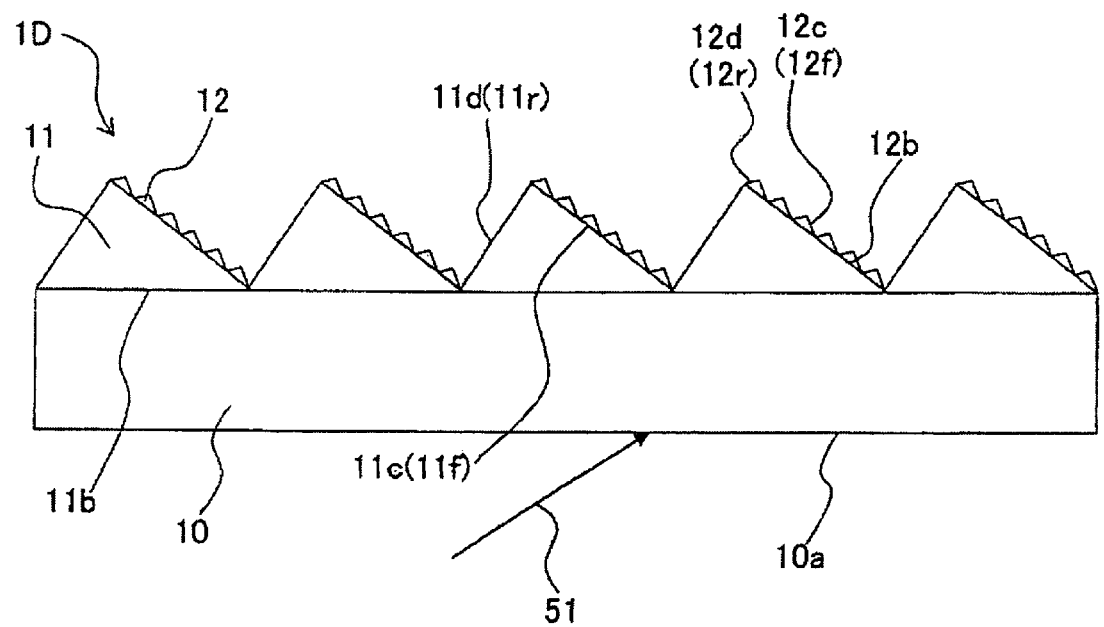

As shown in FIGS. 16A and 16B, an optical adjusting sheet 1F in Inventive Example 5 had six second linear prism portions 12 provided on the inclined side 11c, More specifically, the optical adjusting sheet 1F had six approximately triangular members that form the second sectional parts. The optical adjusting sheet 1F had a front side luminance of 100% or more, the color separation was sufficiently restrained, and no coloring of output light was observed by visual inspection.

Inventive Example 6

An optical adjusting sheet in Inventive Example 6 (not shown) had nine second linear prism portions provided on the inclined side of the first linear prism portion. More specifically, the optical adjusting sheet in Inventive Example 6 had nine approximately triangular members that form the second sectional parts. The optical adjusting sheet in Inventive Example 6 had a front side luminance of 100% or more, the color separation was sufficiently restrained, and no coloring of output light was observed by visual inspection.

Inventive Example 7

Figure 17A:
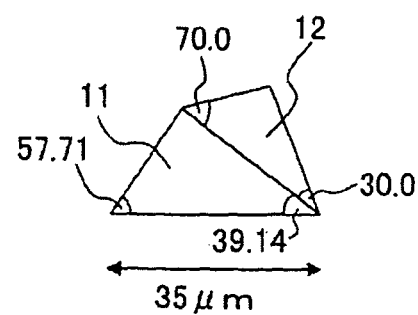
FIGS. 17A and 17B are enlarged sectional views of a linear optical member in Inventive Example 7 of the third embodiment.
Figure 17B:
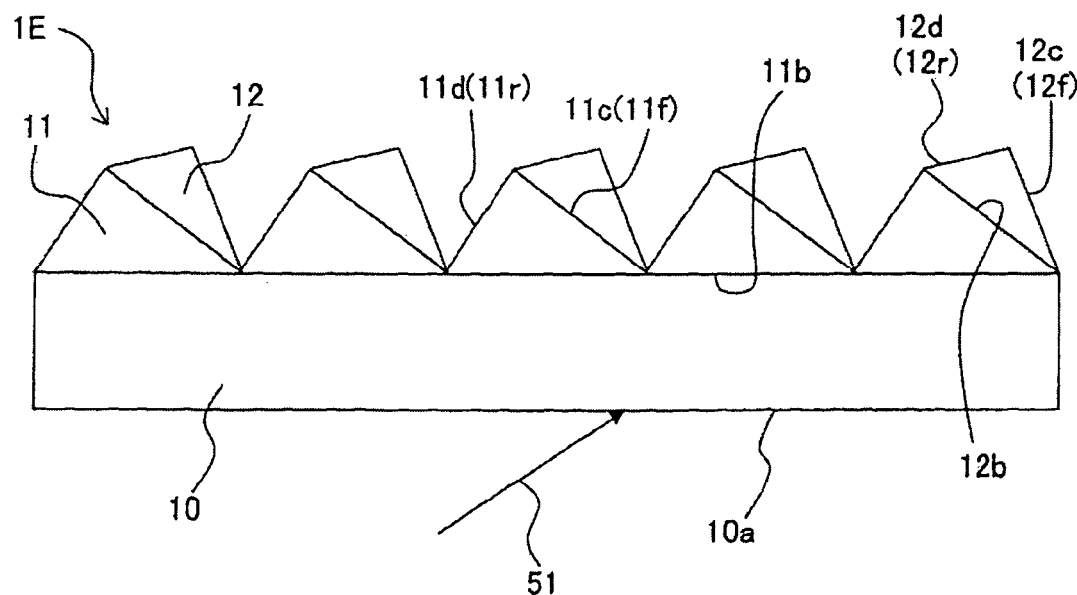

As shown in FIGS. 17A and 17B, an optical adjusting sheet 1G in Inventive Example 7 had one second linear prism portion 12 provided on the inclined side 11c of the first linear prism portion 11. More specifically, the optical adjusting sheet 1G had one approximately triangular member that forms the second sectional part. The optical adjusting sheet 1G had a front side luminance of 100% or more, but the color separation was not sufficiently restrained, and the coloring of output light was observed by visual inspection. Note that the degree of coloring of output light observed in Inventive Example 7 was smaller than the degree of coloring in Comparative Example 2 for the first embodiment described above.

This is probably for the following reason. As described above, by widening the light collecting surface of the second linear prism portion positioned closest to the base angle side ($\alpha_1$ side) of the first linear prism portion 11, the use efficiency of incident light can be improved and the luminance can be improved. This is because the second linear prism portion forming surface 11c of the first linear prism part 11 has a wider opening angle with respect to the base member surface as it is closer to the side of the base angle $\alpha_1$, and the intensity of light passing through the surface 11c is greater (higher illuminance results) as it is closer to the side of the base angle $\alpha_1$. Therefore, when the second linear prism part is made of one triangular member as in Inventive Example 7, the light collecting surface of the second linear prism part positioned closer to the $\alpha_1$ side is most widened. This allows light with higher intensity to be collected, so that the use efficiency of incident light can be improved and the luminance of the output light can be increased. On the other hand, since the light transmitted through the correction surface is relatively reduced, the function of restraining the color separation becomes insufficient, and coloring of output light remains. Furthermore, since the light transmitted through the correction surface is relatively reduced, the diffusion effect of the output angle by the correction surface becomes insufficient, and therefore the angle of visibility is narrowed. Therefore, the luminance of the peak of the output light was sufficient in Inventive Example 7, but the direction was not the front side direction and the front side luminance was smaller than those of the optical adjusting members in Inventive Examples 3 to 5 for the narrowed angle of visibility.

Inventive Example 8

An optical adjusting sheet in Inventive Example 8 (not shown) had 10 second linear prism portions provided on the inclined side of the first linear prism portion. More specifically, the optical adjusting sheet in Inventive Example 8 had 10 approximately triangular members that form the second sectional parts. In the optical adjusting sheet in Inventive Example 8, the color separation was sufficiently restrained and no coloring of the output light was observed by visual inspection, but the front side luminance was less than 100%.

Inventive Example 9

An optical adjusting sheet in Inventive Example 9 (not shown) had 15 second linear prism portions provided on the inclined side of the first linear prism portion. More specifically, the optical adjusting sheet in Inventive Example 9 had 15 approximately triangular members that form the second sectional parts. In the optical adjusting sheet in Inventive Example 9, the color separation was sufficiently restrained and no coloring of the output light was observed by visual inspection, but the front side luminance was less than 100%.

In Inventive Examples 8 and 9, the area of the correction surface of the second linear prism part provided on the side closer to the first base angle $\alpha_1$ was greater, while the area of the light collecting surface was relatively reduced. This is probably the reason why the color separation restraining effect was sufficient, but the front side luminance was insufficient.

The above-described evaluation results are given in Table 2, In the table, the front side luminance is represented with reference to the front side luminance (100%) in Comparative Example 1 for the first embodiment. The reference for evaluating color homogeneity in Table 2 is the same as that in Table 1.

TABLE 2

|  |  | $\alpha_1$ (°) | $\beta_1$ (°) | $\alpha_2$ (°) | $\beta_2$ (°) | number of steps | front side luminance | homogeneity of color |
|---|---|---|---|---|---|---|---|---|
| Comp. Example 1 | 2 prism sheets | — | — | — | — | — | 100 | ○ | ◎ |
| Comp. Example 2 | 1 prism sheet | — | — | — | — | — | 73 | x | x |
| Inv. Example 3 | — | 39.14 | 57.71 | 30 | 70 | 3 | 107 | ○ | ◎ |
| Inv. | — | 39.14 | 57.71 | 30 | 70 | 2 | 106 | ○ | ◎ |

TABLE 2-continued

|  | $\alpha_1$ (°) | $\beta_1$ (°) | $\alpha_2$ (°) | $\beta_2$ (°) | number of steps | front side luminance | homogeneity of color |
|---|---|---|---|---|---|---|---|
| Example 4 Inv. | — | 39.14 | 57.71 | 30 | 70 | 6 | 106 | ○ | ◎ |
| Example 5 Inv. | — | 39.14 | 57.71 | 30 | 70 | 9 | 102 | ○ | ◎ |
| Example 6 Inv. | — | 39.14 | 57.71 | 30 | 70 | 1 | 102 | ○ | Δ |
| Example 7 Inv. | — | 39.14 | 57.71 | 30 | 70 | 10 | 98 | Δ | ◎ |
| Example 8 Inv. | — | 39.14 | 57.71 | 30 | 70 | 15 | 90 | x | ◎ |
| Example 9 |  |  |  |  |  |  |  |

As in the foregoing, when the number of the second linear prism parts, i.e., the number of approximately triangular members that form the second sectional part is in the range from two to nine, the required front side luminance and the color separation reduction can be both achieved. Stated differently, the number of steps in the step-wise surface 13b of the linear optical member 13 is preferably from two to nine.

In the above-described experiments, the particular combinations of the base angles $\alpha_1$, $\beta_1$, $\alpha_2$ and $\beta_2$ are described. However, a plurality of experiments were carried out with optical adjusting sheets that satisfied the following expression for the incident angle of the luminance peak light in the range from 45 degree to 85 degree, and the same results were obtained. In the following expression, the refractive index $n_0$ of the air is 1.0 and the unit of angle is degree.

$$n_0 \sin I_1 = n_1 \sin I_2$$

$$0 \leq \sin(\alpha_1 + \alpha_2 - I_2) \leq 1/n_1$$

$$I_2 \leq \alpha_1 + \alpha_2 \leq I_2 + 90$$

$$-I_2 \leq \beta_2 - \alpha_1 \leq 90 - I_2 \quad (13)$$

In this case, the luminance peak light is refracted without total reflection and can be extracted efficiently from the optical adjusting sheets.

When $I_{2max}$ was the critical angle for total reflection, i.e., when $\sin I_{2max} = 1/n_1$ was established, and a plurality of experiments were carried out with optical adjusting sheets that satisfied the following expression, the same results were obtained.

$$\alpha_1 + \alpha_2 \leq 2 \cdot I_{2max} \quad (14)$$

In this case, when incident light has an angular distribution peaked at the angle of luminance peak light, the incident light at an arbitrary incident angle can be extracted efficiently from the optical adjusting sheets without total reflection at the light collecting surface.

In this way, in optical adjusting sheets with combinations of angles that satisfy the above-described angular requirements, the color separation can surely be restrained, the luminance characteristic can be improved, and light can efficiently be extracted from the optical adjusting sheet while the total reflection at the light collecting surface is restrained. The optical adjusting sheet according to the invention does not have to satisfy the above-described angular requirements, and the invention is applicable to optical adjusting sheets with arbitrary combinations of angles.

Note that according to the described fourth embodiment, the optical adjusting sheet includes the first and second linear prism portions in prescribed sizes. For example, in Inventive Examples 3 to 6 described above, the length of the base 11b of the first linear prism portion in contact with the base member of the optical adjusting sheet was 35 μm, but the invention is not limited to the arrangement. When for example the length of the base 11b is in the range from 7 μm to 100 μm, both the required front side luminance and the color separation reduction can be achieved while the number of approximately triangular members that form the second sectional parts is in the range from two to nine.

Industrial Applicability

A single optical adjusting member according to the invention can restrain the color separation of outgoing light and the user efficiency of incident light can be improved. Therefore, the optical adjusting member according to the invention is particularly preferably used as an optical member capable of controlling the optical directivity of an edge light type illumination device and a liquid crystal display device.

The liquid crystal display device and the illumination device according to the invention include the optical adjusting member according to the invention, and therefore the optical characteristics can be improved while the thickness and cost of the devices are reduced. Therefore, the liquid crystal display device and the illumination device according to the invention are preferably applied to liquid crystal display devices and illumination devices for various kinds of use.

What is claimed is:

1. An optical adjusting member, comprising:
  a base member having optical transparency; and
  a plurality of linear members provided on said base member and having optical transparency,
  a section of said linear member orthogonal to the lengthwise direction of said linear member including:
  a triangular first sectional part defined by first to third sides; and
  an approximately triangular second sectional part having a smaller area than that of said first sectional part and defined by fourth to sixth sides,
  the first side of said first sectional part being in contact with the surface of said base member, said second sectional part being formed on the second side of said first sectional part, and the fourth side of said second sectional part being in contact with the second side of said first sectional part.

2. The optical adjusting member according to claim 1, wherein a plurality of said second sectional parts are provided on the second side of said first sectional part.

3. The optical adjusting member according to claim 2, wherein said plurality of second sectional parts have the same shape and size.

4. The optical adjusting member according to claim 2, wherein said plurality of second sectional parts have similar shapes to one another.

5. The optical adjusting member according to claim 2, wherein the vertical angles of said plurality of second sectional parts opposed to the fourth sides are the same angle among each other.

6. The optical adjusting member according to claim 2, wherein the number of said second sectional parts is from two to nine.

7. The optical adjusting member according to claim 1, wherein among said fifth and sixth sides of said second sectional part, the side closer to the vertical angle opposed to the first side of said first sectional part is shorter than the other side.

8. The optical adjusting member according to claim 1, wherein the fifth side and sixth side of said second sectional part are inclined with respect to the fourth side so that when luminance peak light that travels in the direction in which its luminance is maximized in the luminance characteristic of light incident to said optical adjusting member is refracted at said optical adjusting member, the traveling direction of the luminance peak light after the refraction at a surface of said linear member including the fifth side and the traveling direction of the luminance peak after the refraction at a surface of said linear member including the sixth side are reversed from each other with respect to the traveling direction of the luminance peak light before the refraction.

9. The optical adjusting member according to claim 1, wherein the inclination direction of the third side of said first sectional part to the first side is approximately parallel to the direction in which the luminance is maximized in the luminance characteristic of light incident to said optical adjusting member.

10. The optical adjusting member according to claim 1, wherein said plurality of linear members are provided periodically in the direction orthogonal to the lengthwise direction.

11. The optical adjusting member according to claim 1, wherein when the refractive index of said linear member is $n_1$, the refractive index $n_0$ of the air that surrounds said base member and said linear members is 1.0, the angle formed by the normal direction of an interface between said air and said base member and the direction of said light in said air is $I_1$ degree, the angle formed by said normal direction and the direction of said light inside said linear member is $I_2$ degree, and the angle formed by the first and second sides, the angle formed by the fourth and fifth sides, and the angle formed by the fourth and sixth sides are $\alpha_1$, $\alpha_2$, and $\beta_2$ degree, respectively, the following expressions are satisfied $$n_0 \sin I_1 = n_1 \sin I_2$$

$$0 \leq \sin(\alpha_1 + \alpha_2 - I_2) \leq 1/n_1$$

$$I_2 \leq \alpha_1 + \alpha_2 \leq I_2 + 90$$

$$-I_2 \leq \beta_2 - \alpha_1 \leq 90 - I_2.$$

12. The optical adjusting member according to claim 1, wherein when the refractive index of said linear member is $n_1$, the critical angle for total reflection of said light at the interface between the air that surrounds said base and said linear members and said linear members is $I_{2max}$ degree, where $\sin I_{2max} = 1/n_1$ is satisfied, and the angle formed by the first and second sides and the angle formed by the fourth and fifth sides are $\alpha_1$ and $\alpha_2$ degree, respectively, the following expression is satisfied $$\alpha_1 + \alpha_2 \leq 2 \cdot I_{2max}.$$

13. The optical adjusting member according to claim 1, wherein the refractive index of said base member is the same as the refractive index of said linear member.

14. The optical adjusting member according to claim 1, wherein said base member has a different refractive index from that of said linear member and is formed in a parallel-plate shape.

15. An optical adjusting member, comprising:
a base member having optical transparency; and
a plurality of linear members provided on said base member and having optical transparency,
a section of said linear member orthogonal to the lengthwise direction of said linear member having an approximately triangular shape, one of the three sides that define the section being in contact with the surface of the base member, one of the other two sides being provided with steps,
wherein when the refractive index of said linear member is $n_1$, the refractive index $n_0$ of the air that surrounds said base member and said linear member is 1.0, the angle formed by the normal direction of an interface between said air and said base member and the direction of said light in said air is $I_1$ degree, the angle formed by said normal direction and the direction of said light inside said linear members is $I_2$ degree, the angle formed by the side having said steps and said base member is $\alpha_1$ degree, and among the base angles of said steps, the base angle on the side closer to said base member and the base angle on the side further from said base member are $\alpha_2$ degree and $\beta_2$ degree, respectively, the following expressions are satisfied $$n_0 \sin I_1 = n_1 \sin I_2$$

$$0 \leq \sin(\alpha_1 + \alpha_2 - I_2) \leq 1/n_1$$

$$I_2 \leq \alpha_1 + \alpha_2 \leq I_2 + 90$$

$$-I_2 \leq \beta_2 - \alpha_1 \leq 90 - I_2.$$

16. An optical adjusting member, comprising:
a base member having optical transparency; and
a plurality of linear members provided on said base member and having optical transparency,
a section of said linear member orthogonal to the lengthwise direction of said linear member having an approximately triangular shape, one of the three sides that define the section being in contact with the surface of the base member, one of the other two sides being provided with steps,
wherein when the refractive index of said linear member is $n_1$, the critical angle for total reflection of said light at an interface between the air that surrounds said base member and said linear members and said linear members is $I_{2max}$ degree, where $\sin I_{2max} = 1/n_1$ is satisfied, the angle formed by the side having said steps and said base member is $\alpha_1$ degree and the base angle on the side closer to said base member among the base angles of said steps is $\beta_2$, the following expression is satisfied $$\alpha_1 + \alpha_2 \leq 2 \cdot I_{2max}.$$

17. An illumination device, comprising:
a light source;
an optical adjusting member; and
a light guide plate used to guide light emitted from said light source to said optical adjusting member,
said optical adjusting member including:
a base member having optical transparency; and a plurality of linear members provided on said base member and having optical transparency, a section of said linear member orthogonal to the lengthwise direction of said linear member including:

a triangular first sectional part defined by first to third sides; and an approximately triangular second sectional part having a smaller area than that of the first sectional part and defined by fourth to sixth sides, the first side of the first sectional part being in contact with the surface of said base member, the second sectional part being formed on the second side of said first sectional part, and the fourth side of said second sectional part being in contact with the second side of said first sectional part.

18. The illumination device according to claim 17, wherein said optical adjusting member is provided in contact with the light guide plate.

19. The illumination device according to claim 17, further comprising a reflection member provided on the side of the light guide plate opposite to said optical adjusting member.

20. A liquid crystal display device, comprising:

a light source;

an optical adjusting member;

a light guide plate that guides light emitted from said light source to said optical adjusting member; and a liquid crystal display element provided on the side of said optical adjusting member opposite to said light guide side, said optical adjusting member including:

a base member having optical transparency; and a plurality of linear members provided on said base member and having optical transparency, a section of said linear member orthogonal to the lengthwise direction of the linear member including:

a triangular first sectional part defined by first to third sides; and an approximately triangular second sectional part having a smaller area than that of said first sectional part and defined by fourth to sixth sides, the first side of said first sectional part being in contact with the surface of said base member, said second sectional part being formed on the second side of said first sectional part, and the fourth side of the second sectional part being in contact with the second side of said first sectional part.

21. The liquid crystal display device according to claim 20, wherein said optical adjusting member is provided in contact with the light guide plate.

22. The liquid crystal display device according to claim 20, further comprising a reflection member provided on the side of said light guide plate opposite to said optical adjusting member.

\* \* \* \* \*